United States Patent
Chen et al.

(10) Patent No.: US 7,326,777 B2
(45) Date of Patent: Feb. 5, 2008

(54) FIBER REACTIVE DYESTUFFS

(75) Inventors: Wen-Jang Chen, Jhongli (TW); Hong-Chang Huang, Taipei (TW)

(73) Assignee: Everlight USA, Inc., Pineville, NC (US)

( * ) Notice: Subject to any disclaimer, the term of this patent is extended or adjusted under 35 U.S.C. 154(b) by 110 days.

(21) Appl. No.: 11/246,766

(22) Filed: Oct. 6, 2005

(65) Prior Publication Data

US 2006/0230552 A1   Oct. 19, 2006

(30) Foreign Application Priority Data

Apr. 13, 2005 (CN) .................... 2005 1 0065095

(51) Int. Cl.
*C09B 62/507* (2006.01)
*C09B 62/503* (2006.01)

(52) U.S. Cl. ............ 534/604; 534/605; 534/612; 534/617; 534/618; 534/637; 534/638

(58) Field of Classification Search ........ 534/604, 534/605, 612, 617, 618, 637, 638
See application file for complete search history.

(56) References Cited

U.S. PATENT DOCUMENTS

| | | | |
|---|---|---|---|
| 5,484,899 A * | 1/1996 | Deitz et al. ........... | 534/618 |
| 5,817,779 A | 10/1998 | Deitz et al. ........... | 534/637 |
| 6,329,514 B1 | 12/2001 | Huang et al. .......... | 54/612 |
| 6,734,290 B2 * | 5/2004 | Cho et al. ............. | 534/635 |
| 7,122,667 B2 * | 10/2006 | Tzikas et al. ......... | 544/199 |

FOREIGN PATENT DOCUMENTS

| | | | |
|---|---|---|---|
| EP | 230909 | * | 8/1987 |
| EP | 1367099 | * | 12/2003 |

* cited by examiner

*Primary Examiner*—Fiona T Powers
(74) *Attorney, Agent, or Firm*—Occhiuti Rohlicek & Tsao LLP

(57) ABSTRACT

A fiber reactive dyestuff of the following formula (I)

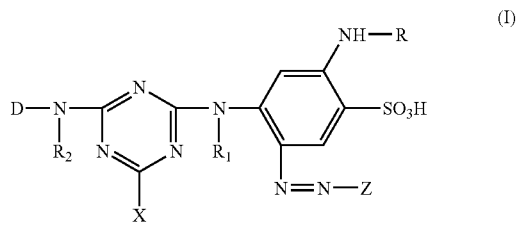

wherein the definition of D, R, $R_1$, $R_2$, X and Z have the same meaning as given in the specification. The fiber reactive dyestuff of the present invention is suitable for dyeing and printing on cellulose fiber or fiber materials containing cellulose. Dyed material with various excellent properties in dyed color can be obtained, showing especially outstanding performance in the property of wash fastness, build-up and chlorine fastness.

23 Claims, No Drawings

FIBER REACTIVE DYESTUFFS

BACKGROUND OF THE INVENTION

1. Field of the Invention

The present invention relates to a dyestuff, and more particularly relates to a fiber reactive dyestuff having low salt and low alkalinity suitable for dyeing and printing cellulose fiber or fiber materials containing cellulose.

2. Description of the Related Art

The fiber reactive dyestuffs are used widely in the dyeing industries for many years, and the primary characteristic is: the reactive groups of the dyestuff molecules may react with the groups on the fibers covalently. Numerous patents are disclosed, for example, in the U.S. Pat. Nos. 4,703,112; 5,484,899; 6,329,514 and British patent GB 1,353,899 there disclosed the commonly used fiber reactive dyestuffs having good build up and other fine dyeing properties suitable for exhaustion dyeing, continuous dyeing or printing.

However the present development of reactive dyestuffs is aiming for economic reactive dyestuffs having high fixation, high build up and wash-off, therefore the properties of the new generation reactive dyestuffs should not only having sufficient substantivity for increasing the chance of fixation, it is also important for the unfixed dyestuffs to have fine wash-off property.

The present inventors invested tremendous amount of research for reactive dyestuffs satisfying the present need, so that the aforementioned problem can be resolved. It is then realized that the aforementioned problem can be solved with the use of reactive azo dyestuff of quaternary ammonium salts. The reactive groups of this kind of quaternary ammonium salts can temporarily enhancing the substantivity of the dyestuffs, and to the fibers demonstrating a higher affinity while having properties of wash-off, biodegradable, good build up, good light fastness, good wash fastness and good chlorine bleaching fastness; as well performs well in other fastness testing and at the same time having the properties of compatibility and fiber level dyeing.

SUMMARY OF THE INVENTION

The dyestuff of the present invention is the fiber reactive dyestuff of the following formula (I),

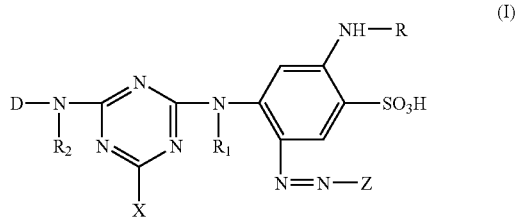

(I)

wherein
Z is a group of the following formula

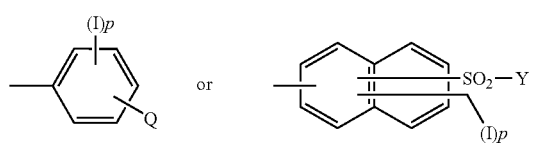

X is a halogen atom, quaternary ammonium salt, pyridine, 3-carboxypyridin-1-yl, 4-carboxypyridin-1-yl, methylpyridinium or carbamoylpyridinium;

Y is —OH, vinyl group or —CH$_2$—CH$_2$—W, wherein W is a leaving group which is eliminable by a base, preferably W is Cl, —OSO$_3$H or

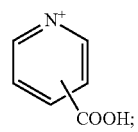

I is sulfo, C$_{1-4}$ alkyl, C$_{1-4}$ alkoxyl or C$_{1-4}$ alkoxycarbonyl; P is 0, 1, 2 or 3;

Q is —SO$_2$—Y, —CONH—(CH$_2$)$_n$—SO$_2$—Y, —(O)$_o$—(CH$_2$)$_m$—CONH—(CH$_2$)$_n$—SO$_2$—Y or —NH—CO-T, wherein Y is defined the same as the aforementioned, T is α,β-dihalopropionyl or α-haloacryloyl, n and m are independently of one another an integer between 1 to 6; p is defined the same as the aforementioned; o is 0, 1, 2 or 3;

R, R$_1$ and R$_2$ are each independently of one another denotes hydrogen atom, C$_{1-4}$ alkyl, or C$_{1-4}$ alkyl substituted by halogen atom, hydroxyl, cyano, C$_{1-4}$ alkoxyl, C$_{1-4}$ alkoxycarbonyl, carboxyl, sulfo, or sulfato;

while R is hydrogen atom, X is quaternary ammonium salts, pyridine, 4-carboxypyridin-1-yl or picoline;

while R is —CH$_2$CH$_2$COOH, X is quaternary ammonium salt, pyridine, picoline or carbamoylpyridinium;

D is a chromophore group having reactive or non-reactive groups, wherein said reactive groups may be one or more each independently selected from the Q group defined the same as above, said chromophore group is selected from the group consisting of: formazan chromophore, anthraquinone, phthalocyanine, triphendioxazine, monoazo, polyazo and metal complex azo. The aforementioned chromophore groups can be detailed description as follow:

(a) formazan chromophore

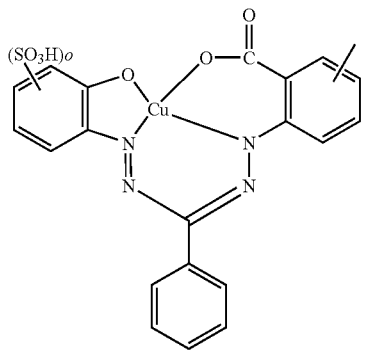

or

-continued

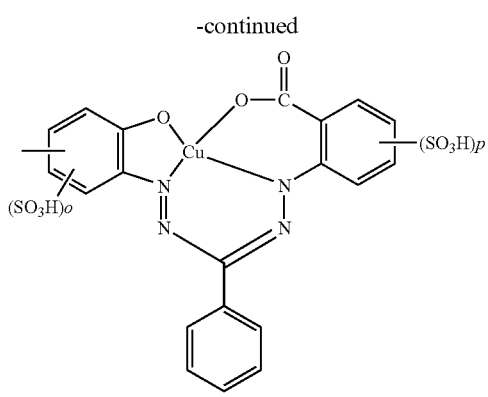

wherein p and o are defined the same as the aforementioned;
(b) anthraquinone

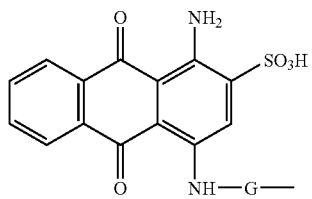

wherein G is phenylene substituted by $C_{1-4}$ alkyl or sulfo;
(c) phthalocyanine

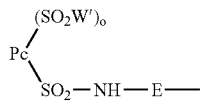

wherein Pc is copper phthalocyanine or nickel phthalocyanine, W' is —OH and/or —NH$_2$, E is phenylene or ethylene; o is defined the same as the aforementioned;
(d) triphendioxazine

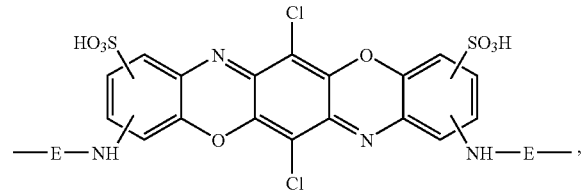

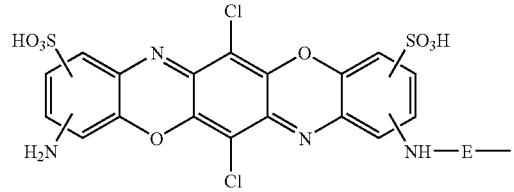

or

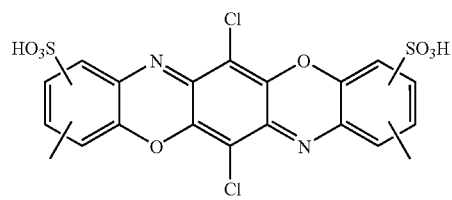

E is defined the same as the aforementioned;
(e) monoazo

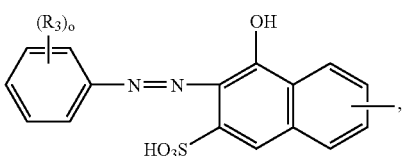

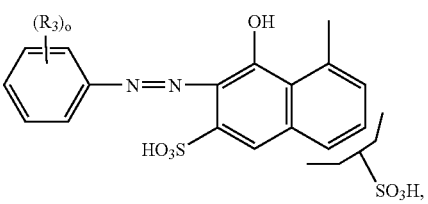

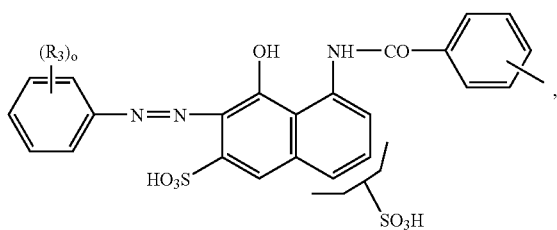

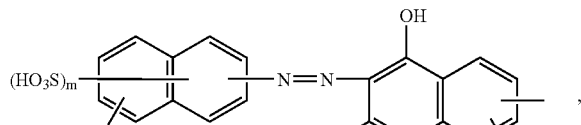

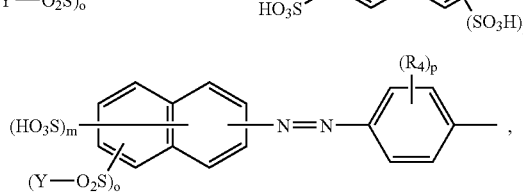

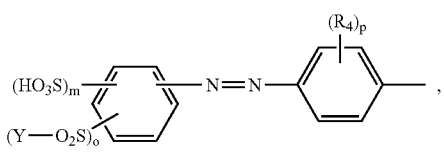

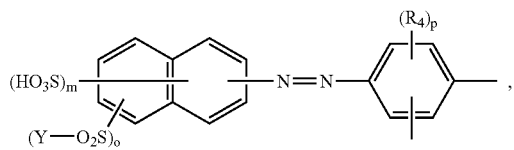

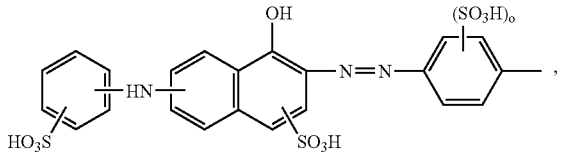

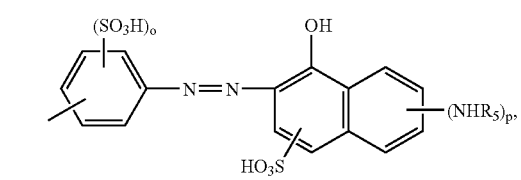

-continued

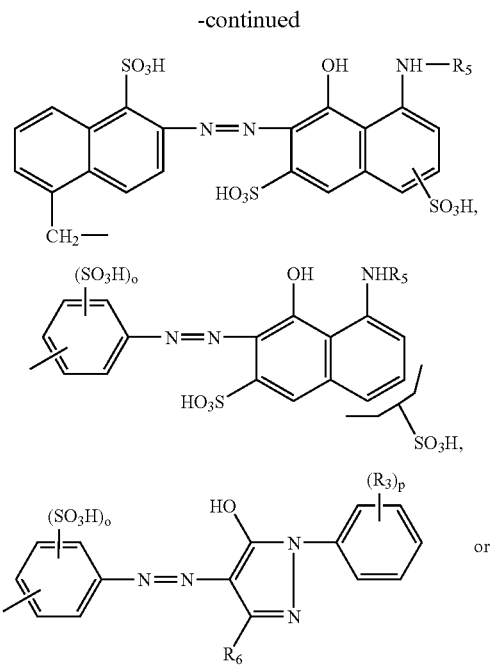

or

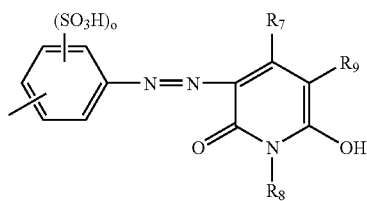

wherein $R_3$ is $C_{1-4}$ alkyl, $C_{1-4}$ alkoxyl, carboxyl, sulfo or $-SO_2-Y$, Y is defined the same as the aforementioned;

$R_4$ is $C_{1-4}$ alkyl, $C_{1-4}$ alkoxyl, amino, acetylamino, ureido or sulfo;

$R_5$ is $C_{1-4}$ alkanoyl or benzoyl;

$R_6$ is $C_{1-4}$ alkyl or carboxyl;

$R_7$ and $R_8$ are $C_{1-4}$ alkyl;

$R_9$ is hydrogen, carbamoyl or sulfomethyl;

wherein m, n, o and p are defined the same as the aforementioned;

(f) polyazo

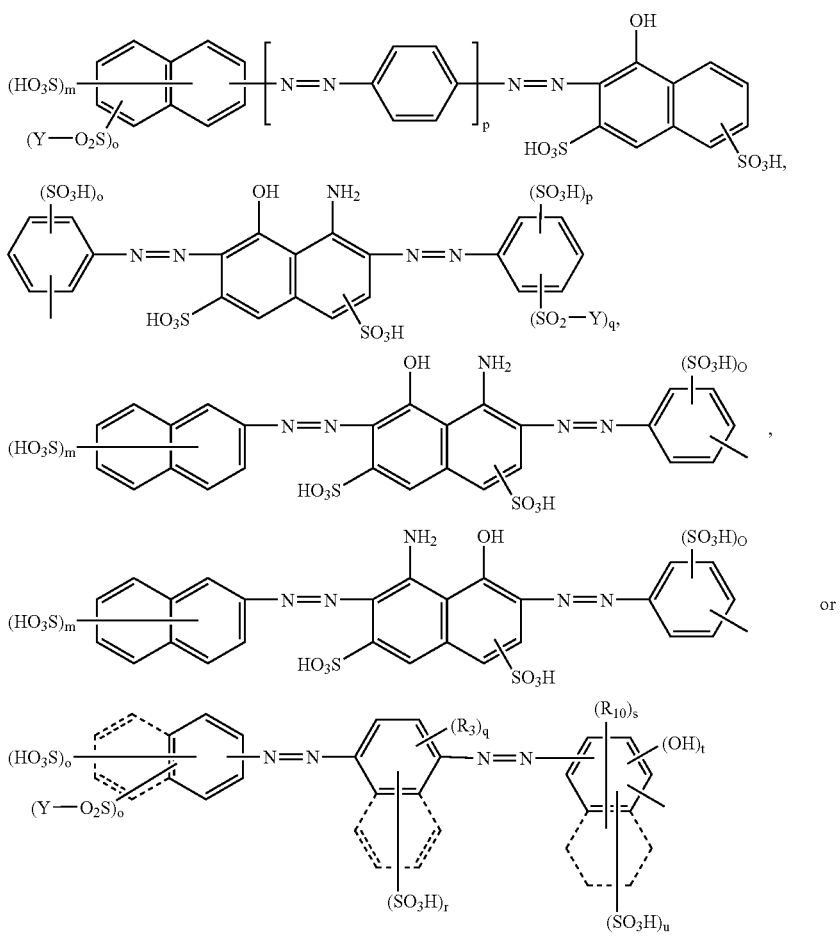

wherein
$R_{10}$ is $C_{1-4}$ alkyl, $C_{1-4}$ alkoxyl, carboxyl, sulfo, acetyl, acetylamino, ureido or —$SO_2$—Y;
q, r, s, t and u each independently is 0, 1, 2 or 3;
$R_3$, Y, m, n, o and p are defined the same as the aforementioned;
or (g) metal complex azo.
More examples of D may be exemplified as follows:
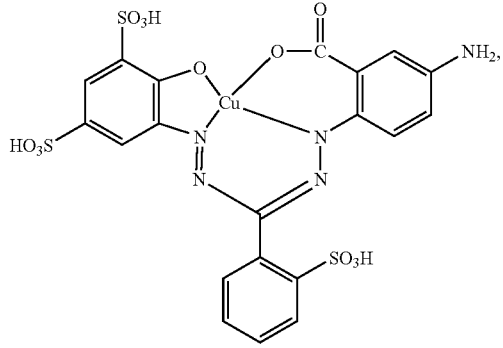
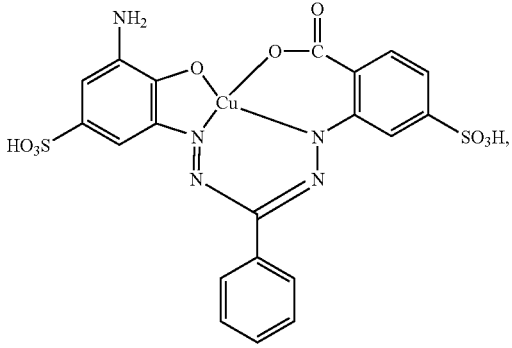
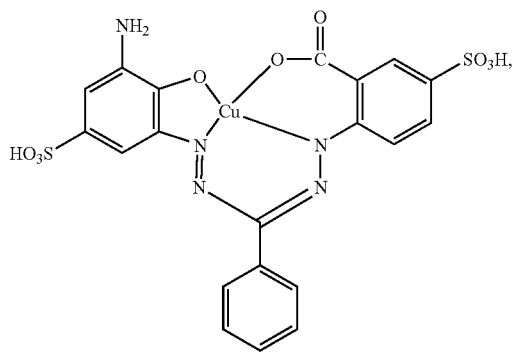
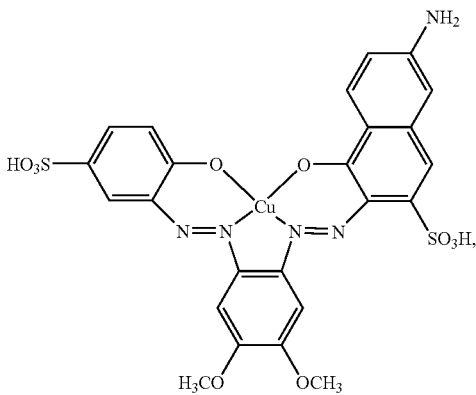
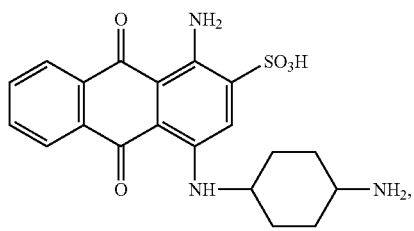
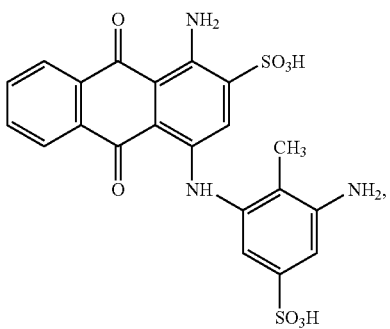
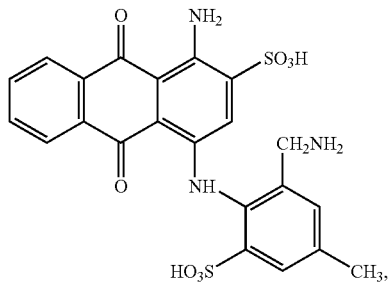
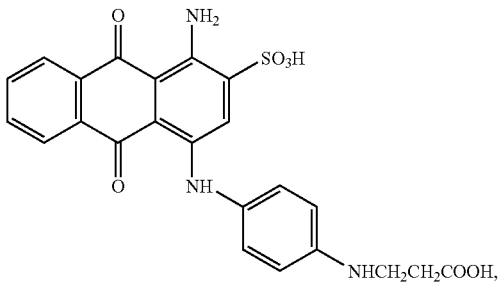

-continued
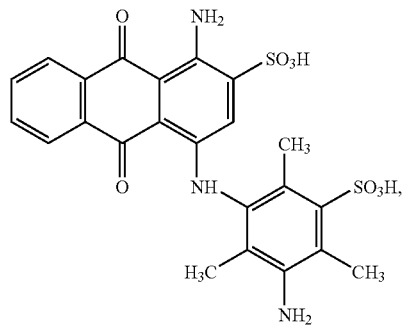
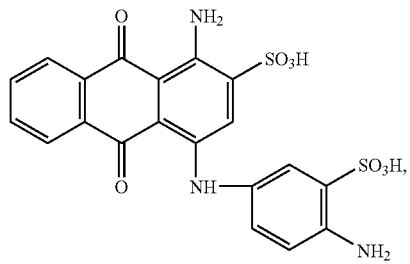
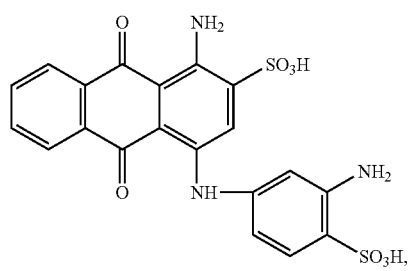
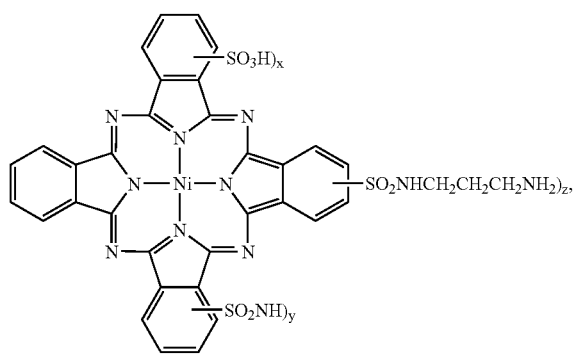
x + y = 2 ~ 3
z = 1 ~ 2
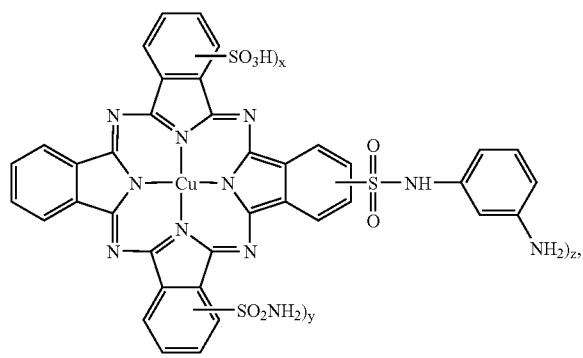
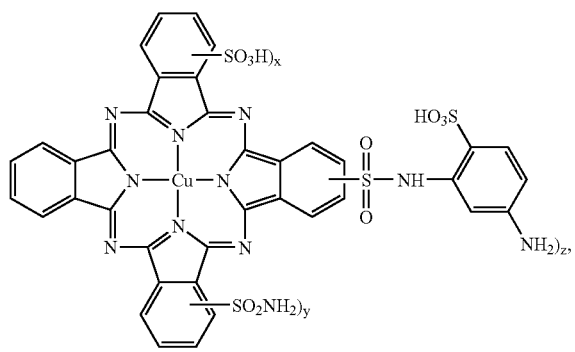
x + y = 2 ~ 3
z = 1 ~ 2
x + y = 2 ~ 3
z = 1 ~ 2
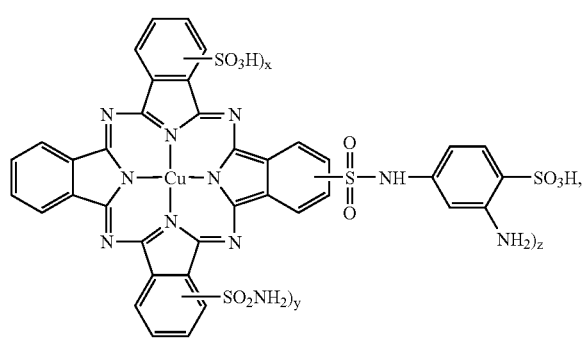
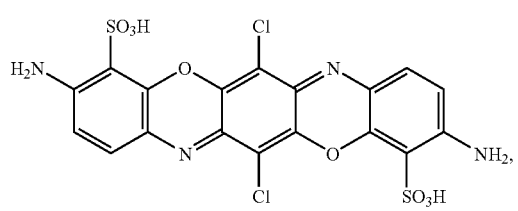
x + y = 2 ~ 3
z = 1 ~ 2

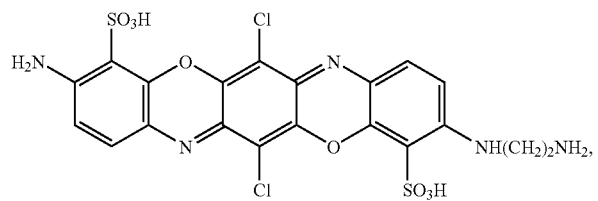
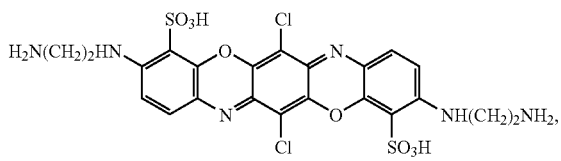
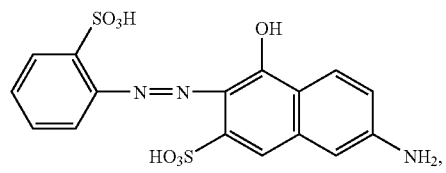
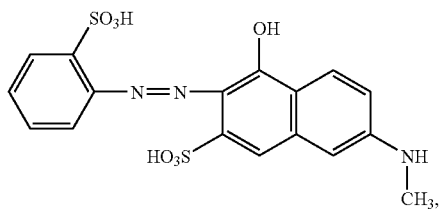
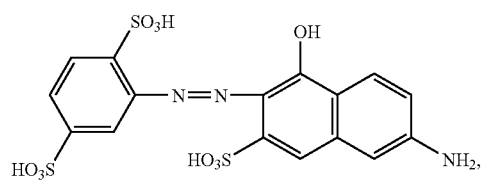
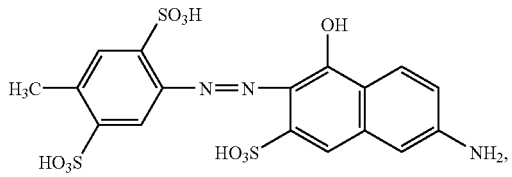
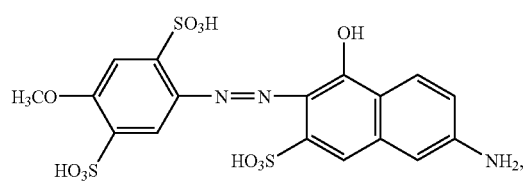
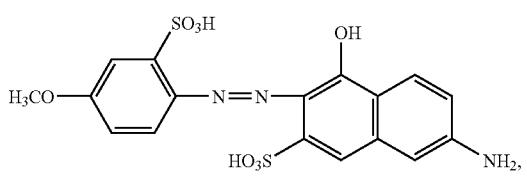
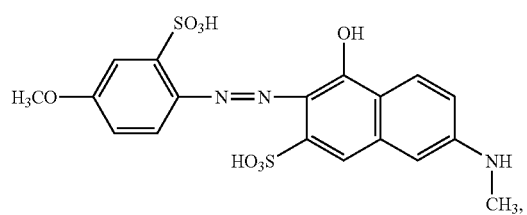
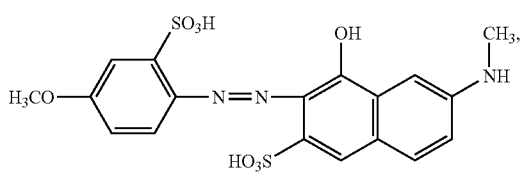
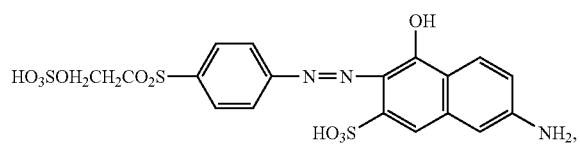
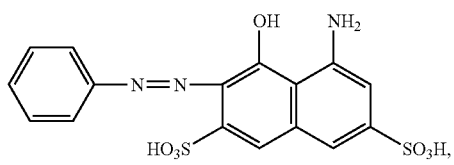
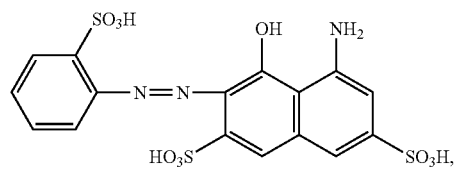
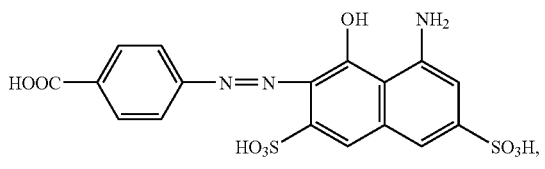
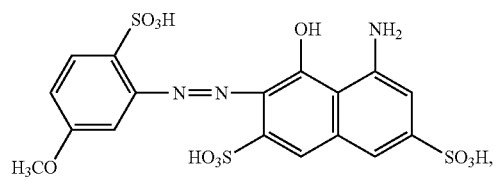
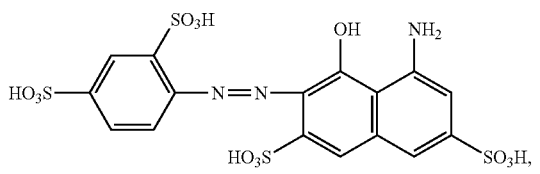
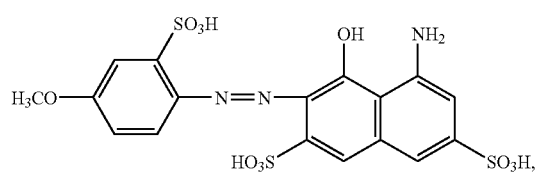
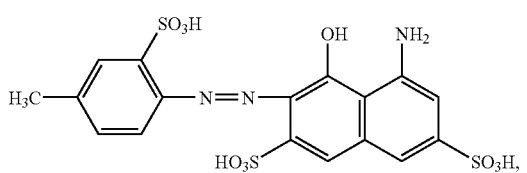

-continued
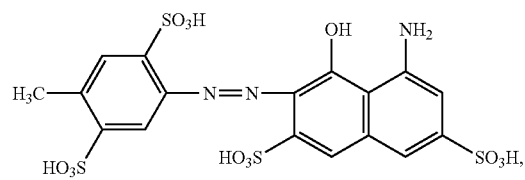
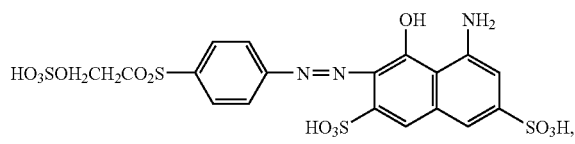
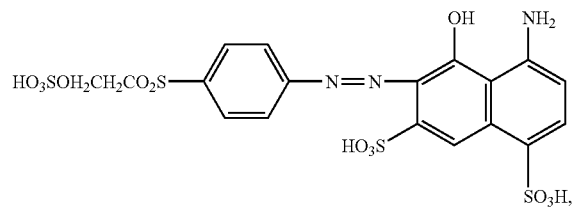
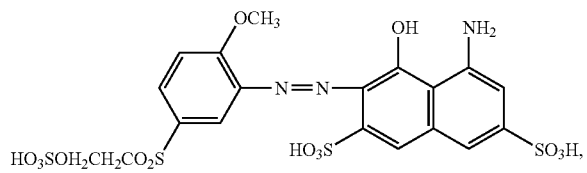
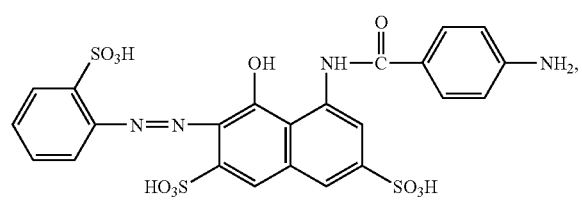
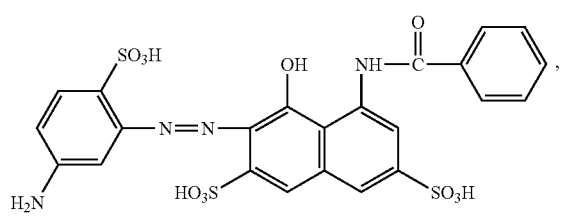
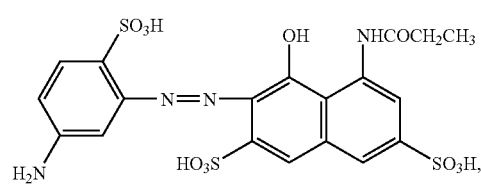
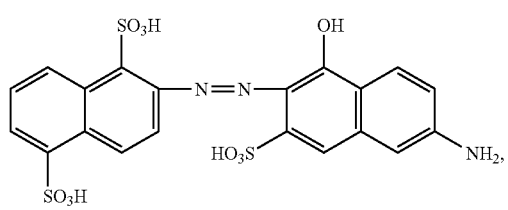
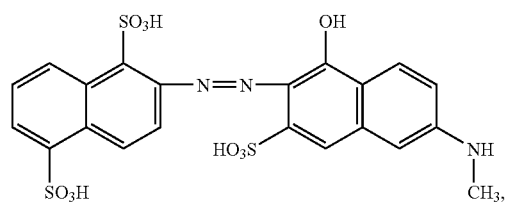
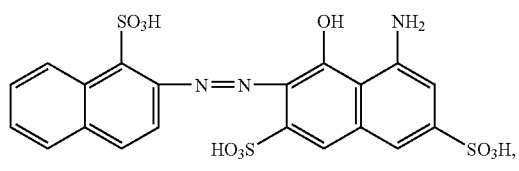
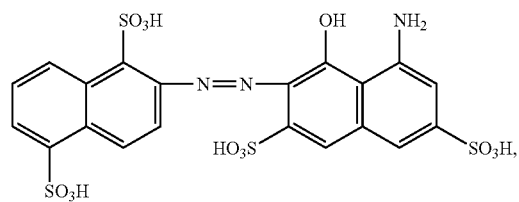
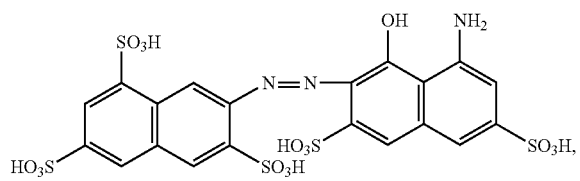
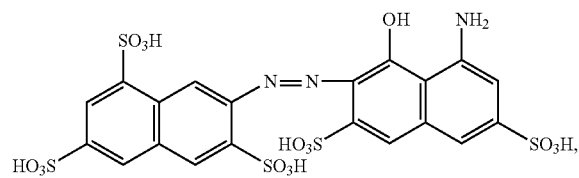
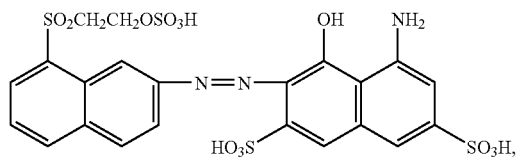
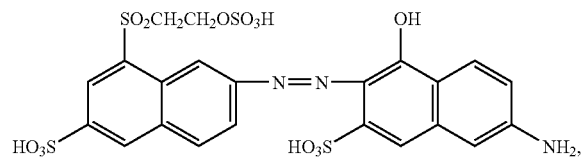
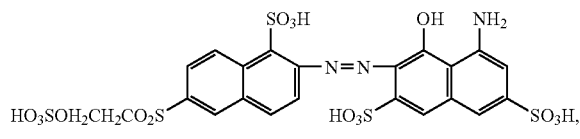

-continued
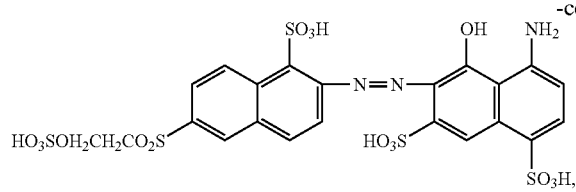
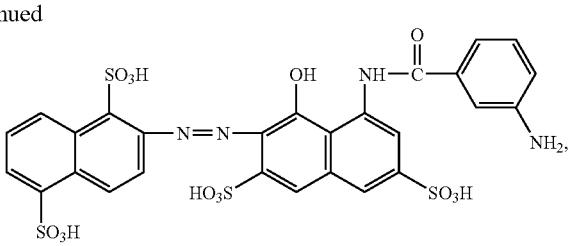
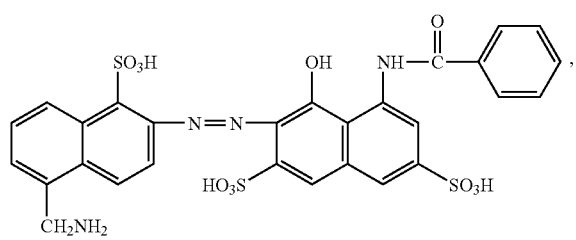
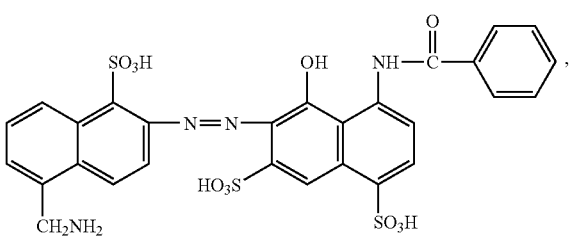
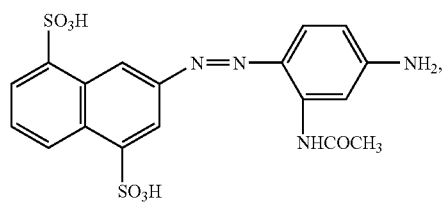
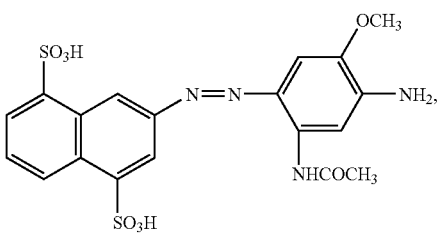
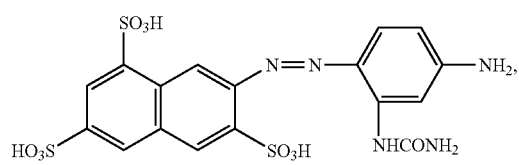
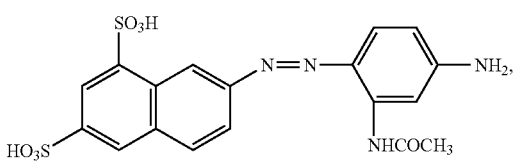
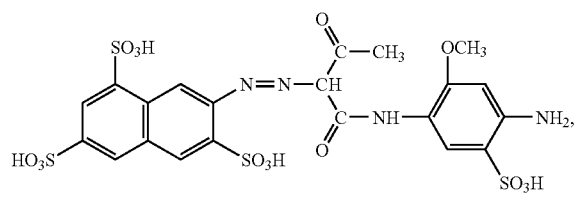
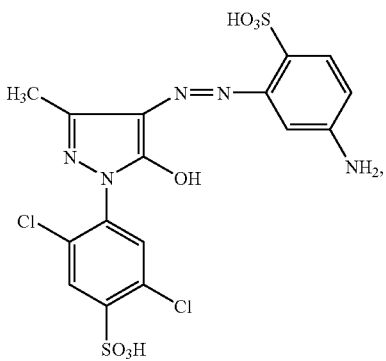
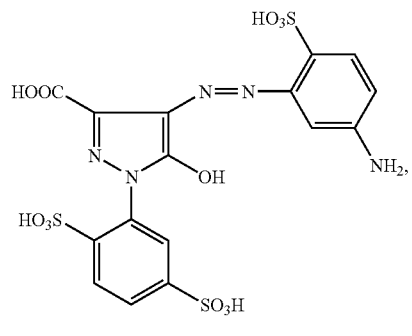
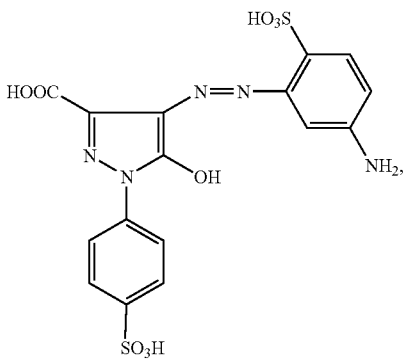

-continued
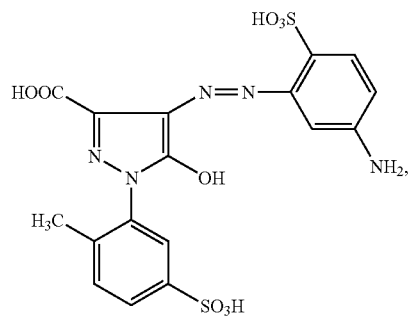
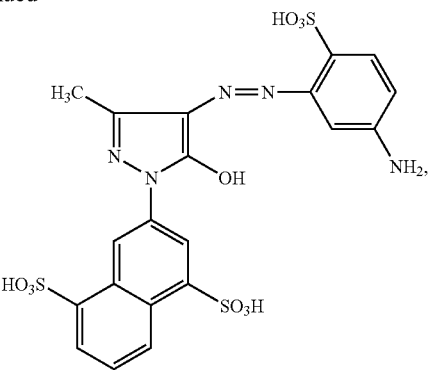
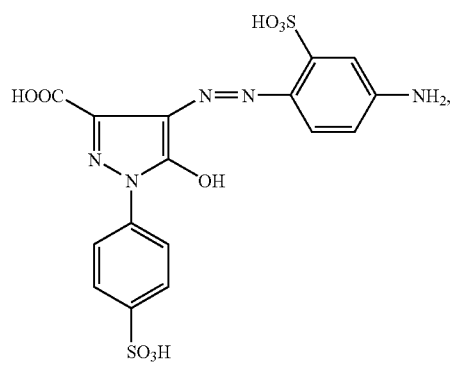
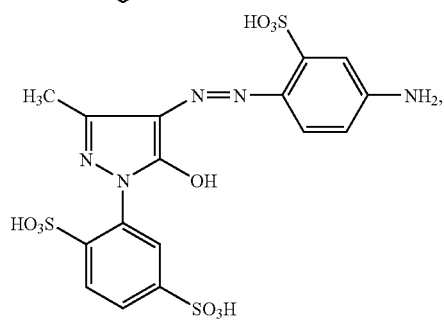
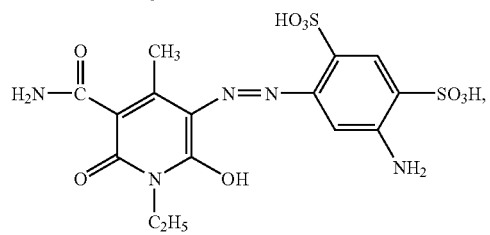
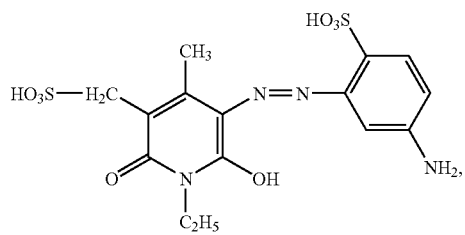
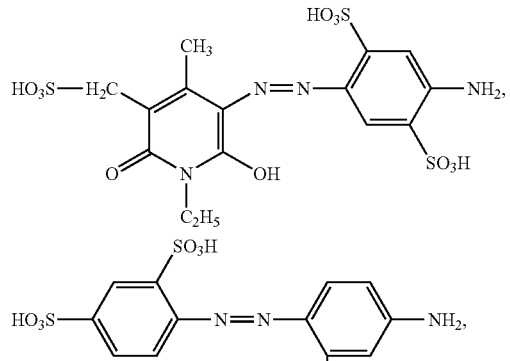
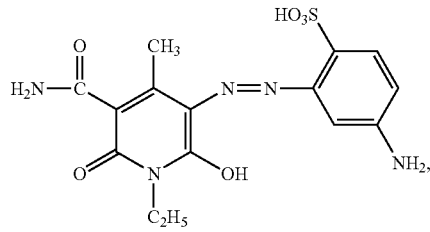
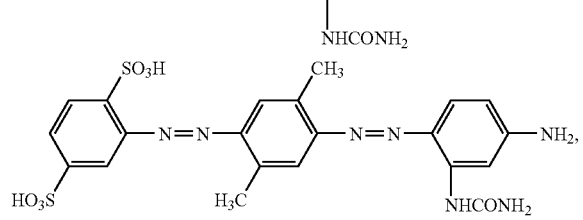
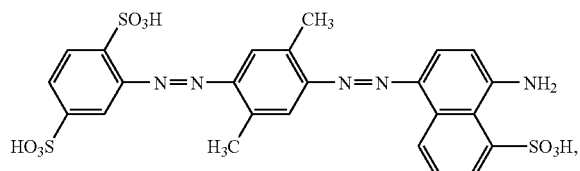
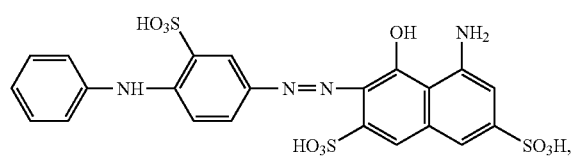
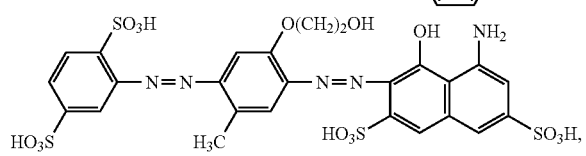

-continued
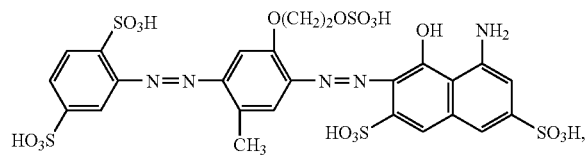
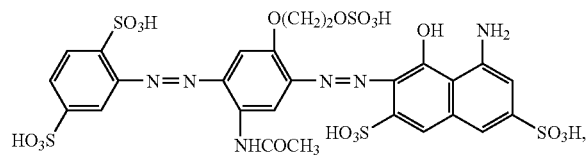
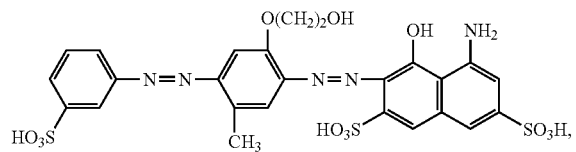
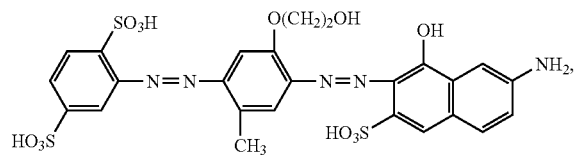
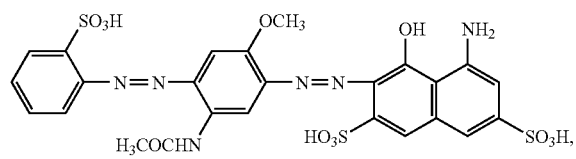
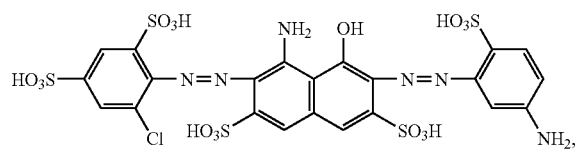
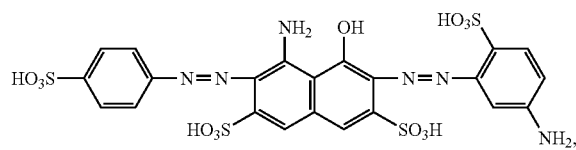
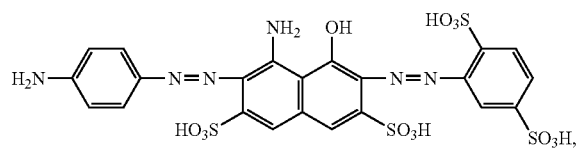
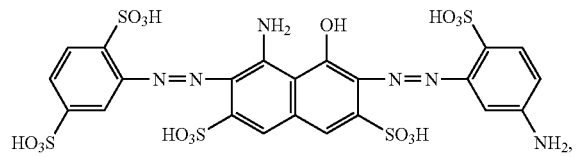
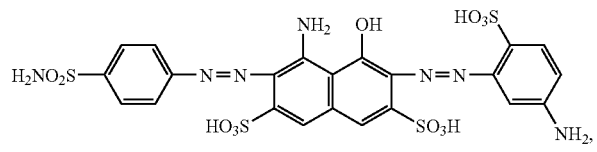
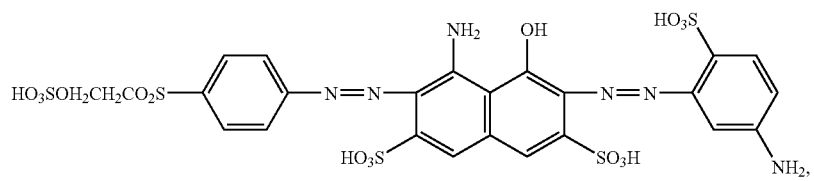
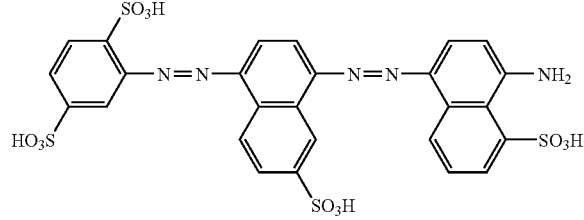
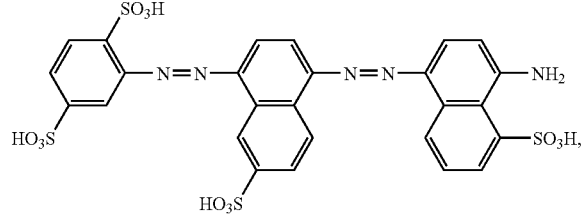
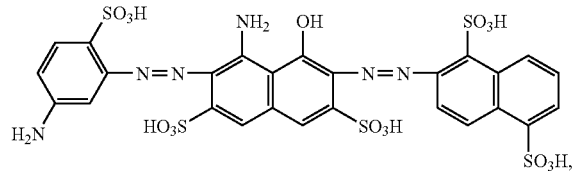
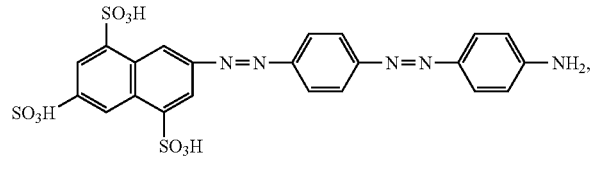
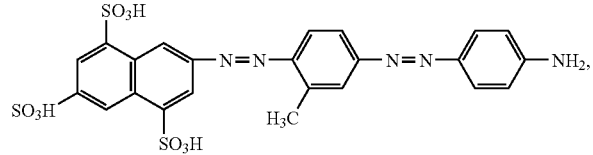
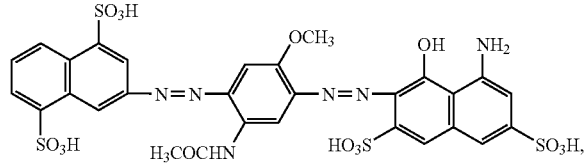

-continued
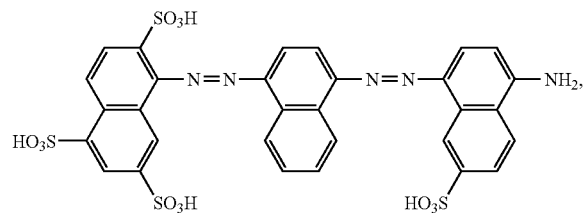
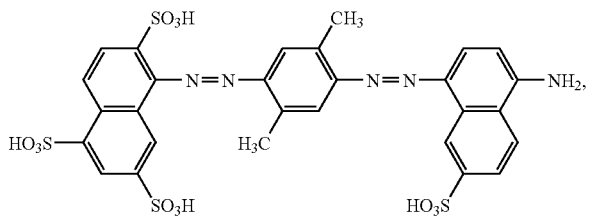
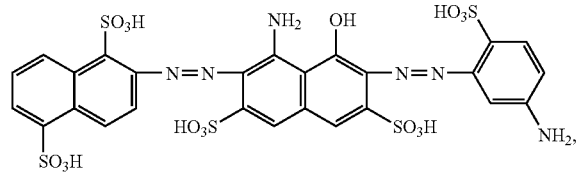
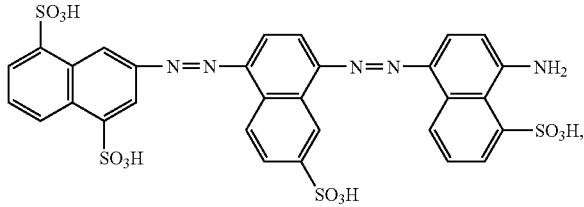
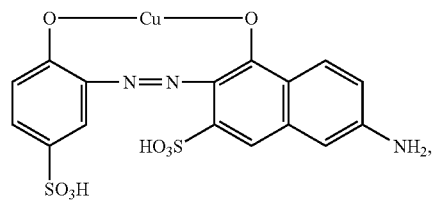
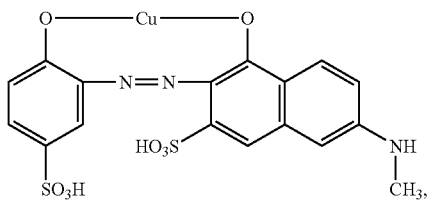
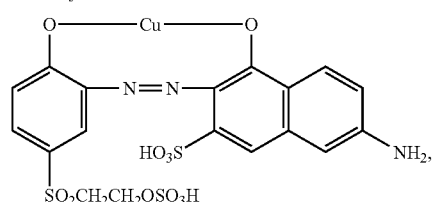
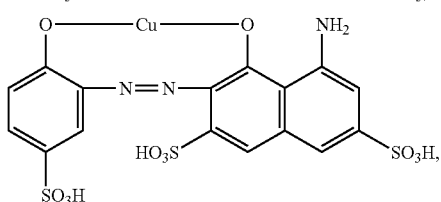
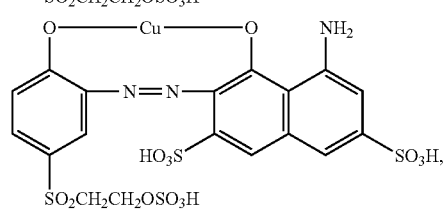
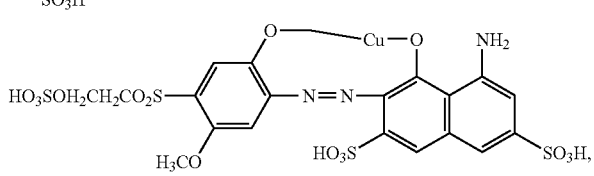
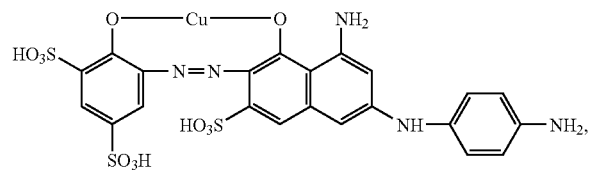
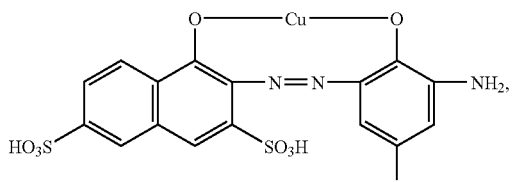
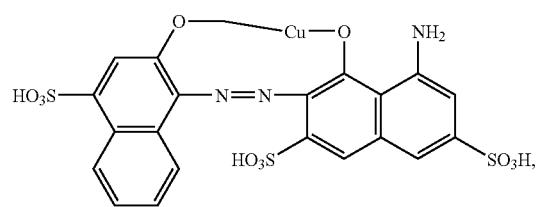
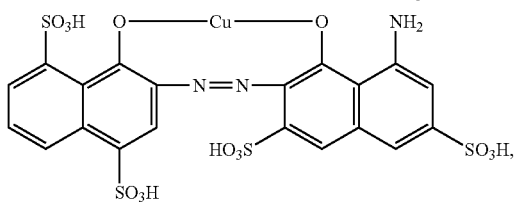
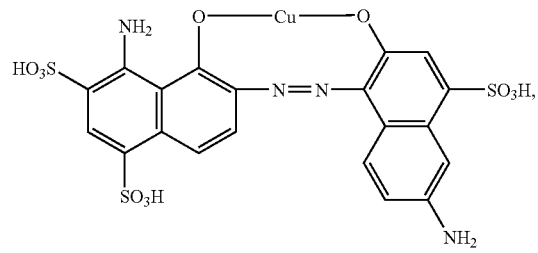
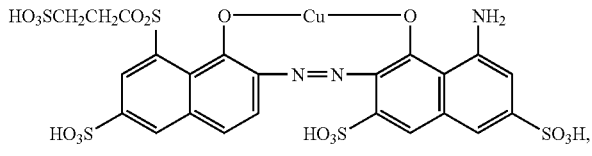

-continued
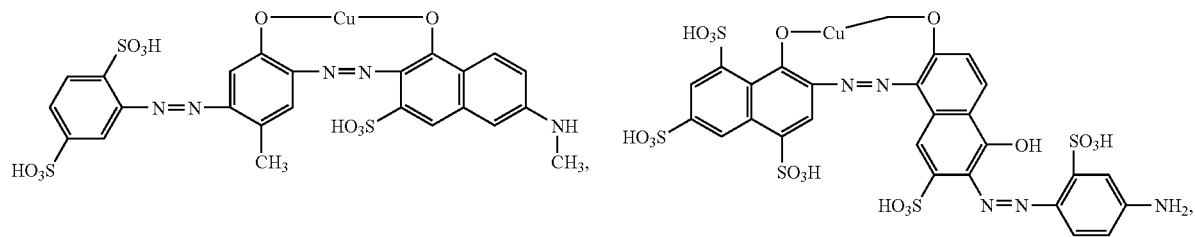
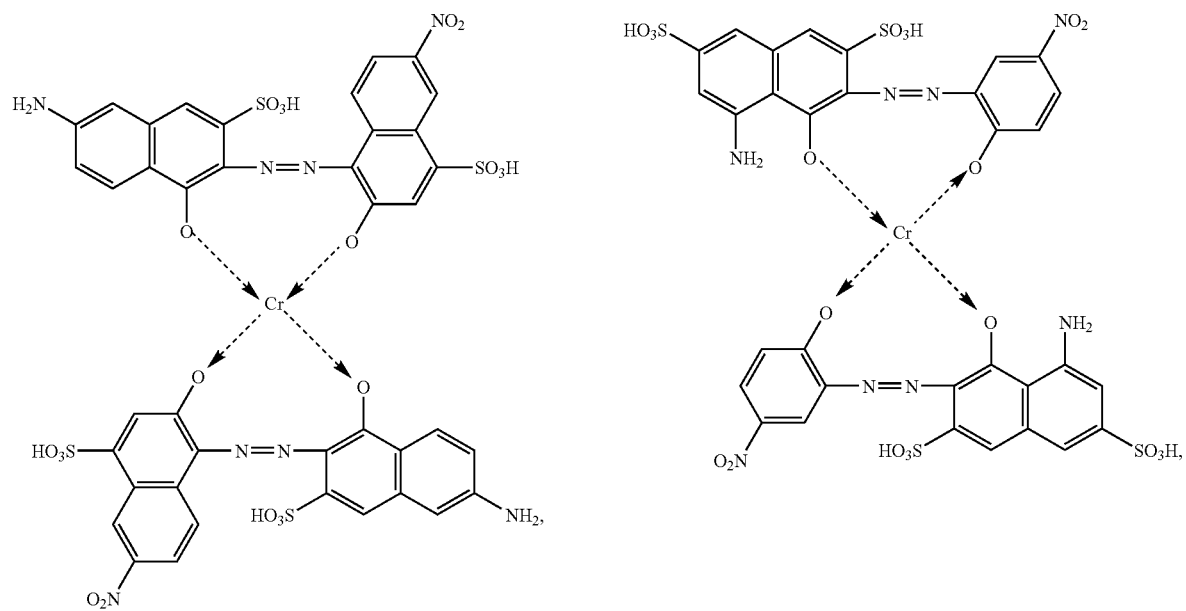
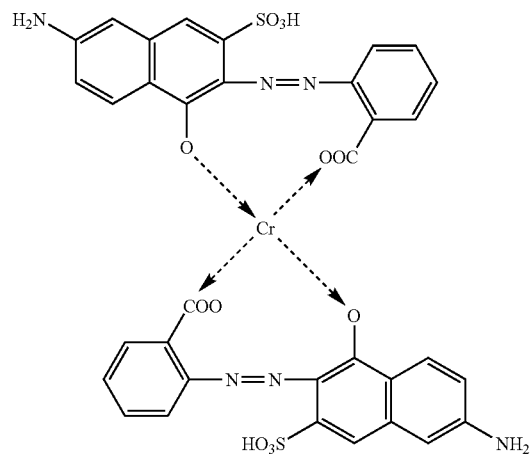

Preferably the reactive dyestuff of formula (I) of the present invention is the reactive dyestuff of the following formula (Ia).

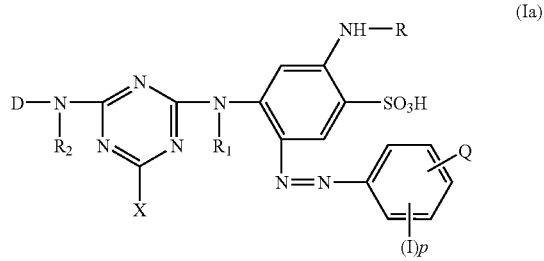
(Ia)

wherein D, X, Q, I, R, $R_1$, $R_2$ and p are defined the same as the aforementioned.

More preferably the reactive dyestuff of formula (I) of the present invention is the reactive dyestuff of the following (Ib).

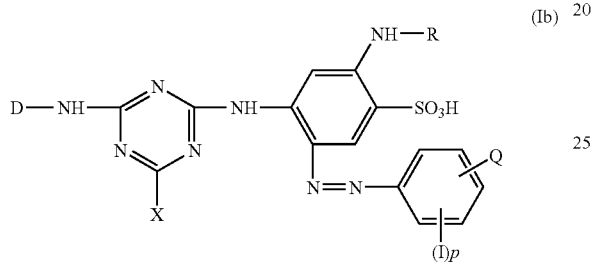
(Ib)

wherein D, X, Q, I, R and p are defined the same as the aforementioned.

Even more preferably the reactive dyestuff of formula (I) of the present invention is the reactive dyestuff of the following formula (Ic).

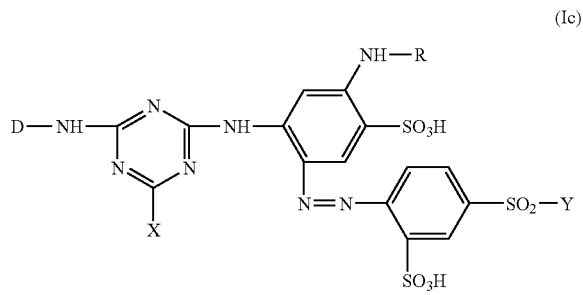
(Ic)

wherein D, X, R and Y are defined the same as the aforementioned.

The fiber reactive dyestuff of formula (I) of the present invention, wherein preferably Z is

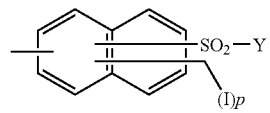

wherein I, p and Y are defined the same as the aforementioned.

The fiber reactive dyestuff of formula (I) of the present invention, wherein more preferably Z is

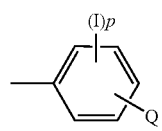

wherein I, p and Q are defined the same as the aforementioned formula (I).

The fiber reactive dyestuff of formula (I) of the present invention, wherein preferably X is quaternary ammonium salt, pyridine, 4-carboxypyridin-1-yl, picoline or carbamoylpyridinium.

The fiber reactive dyestuff of formula (I) of the present invention, wherein preferably W is chlorine atom, —$OSO_3H$ or

The fiber reactive dyestuff of formula (I) of the present invention, wherein preferably Q is —$SO_2$—Y or —CONH—$(CH_2)_n$—$SO_2$—Y, wherein n and Y are defined the same as the aforementioned.

The preferable examples of the fiber reactive dyestuff of formula (I) of the present invention are the reactive dyestuff of formula (1) below

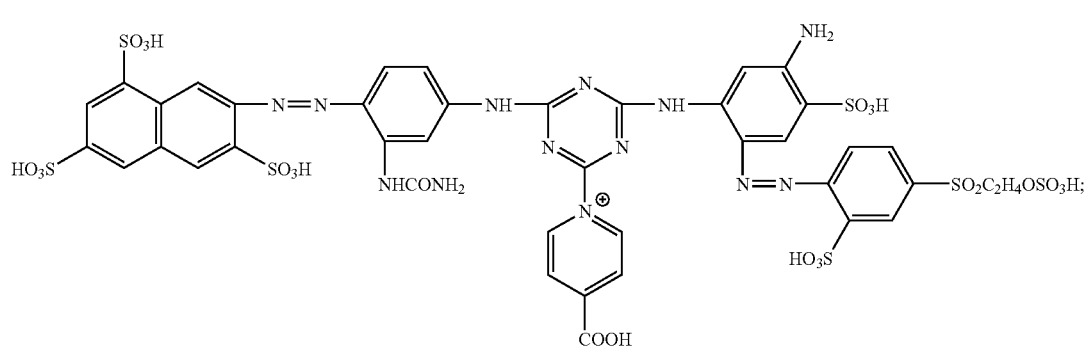
(1)

the reactive dyestuff of formula (2) below
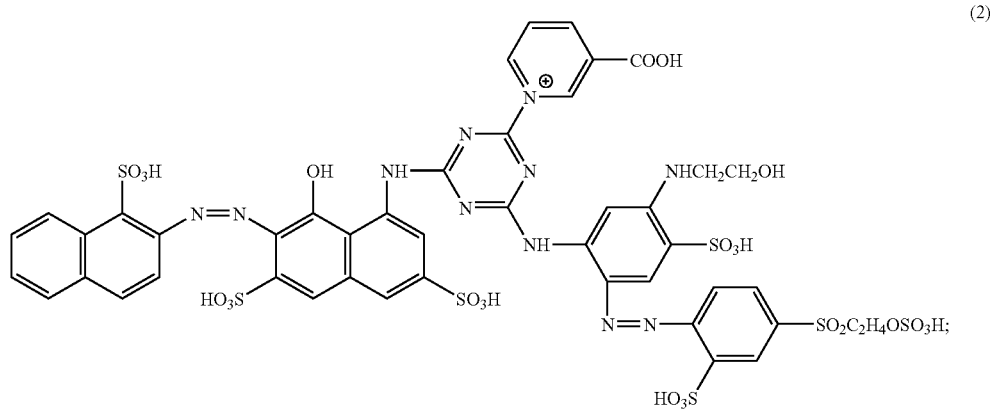
the reactive dyestuff of formula (3) below
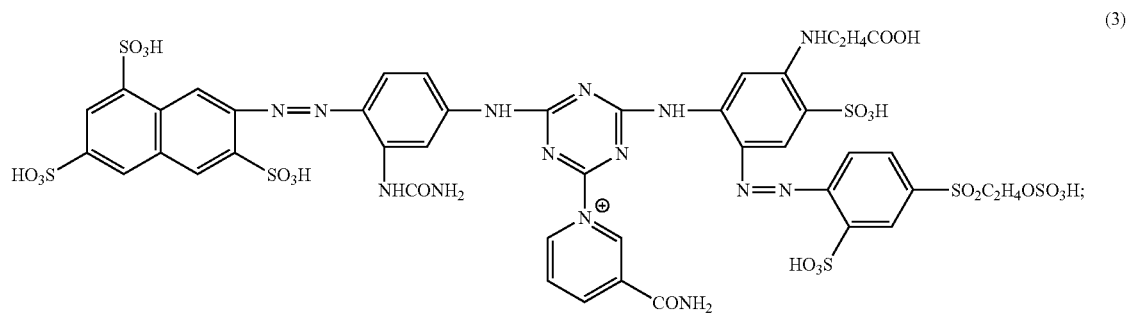
the reactive dyestuff of formula (4) below
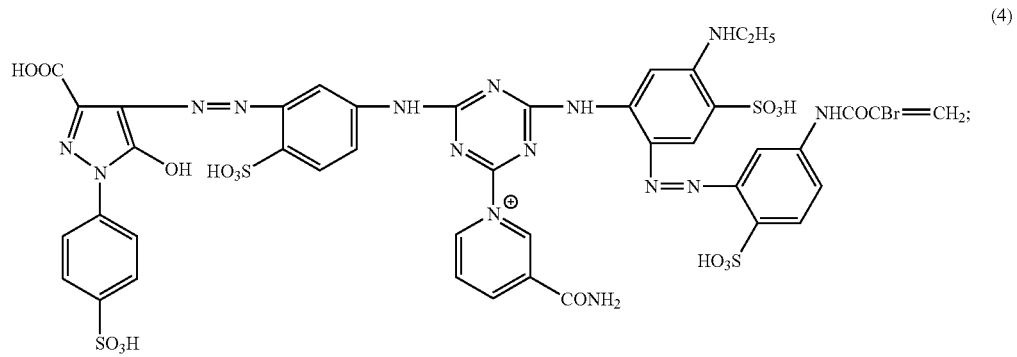

the reactive dyestuff of formula (5) below
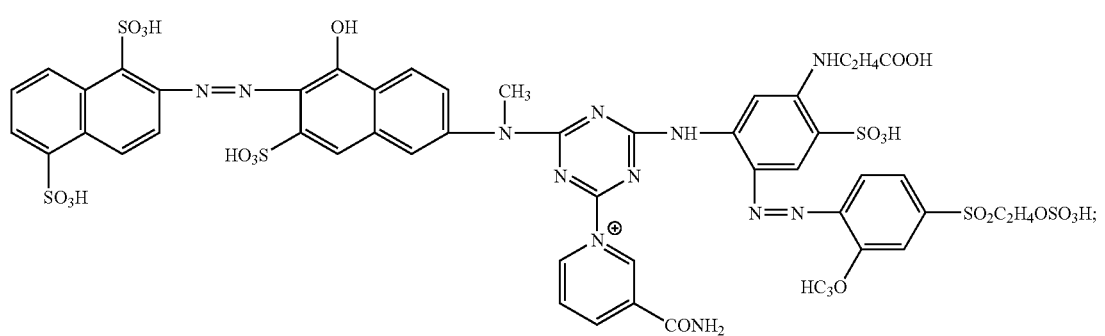
the reactive dyestuff of formula (6) below
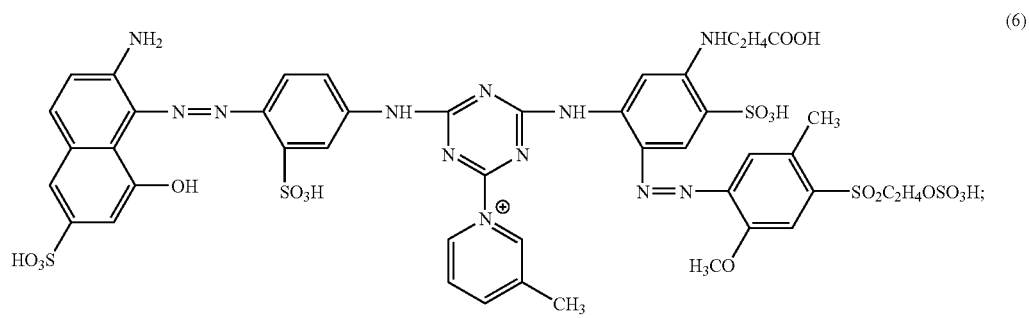
the reactive dyestuff of formula (7) below
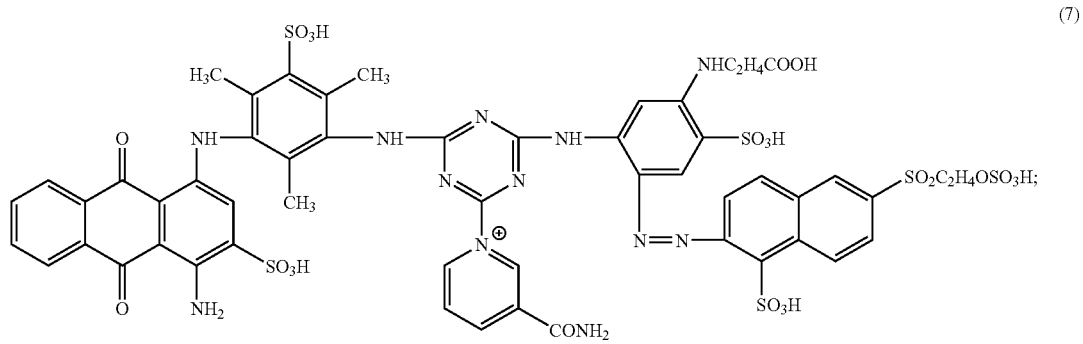

the reactive dyestuff of formula (8) below

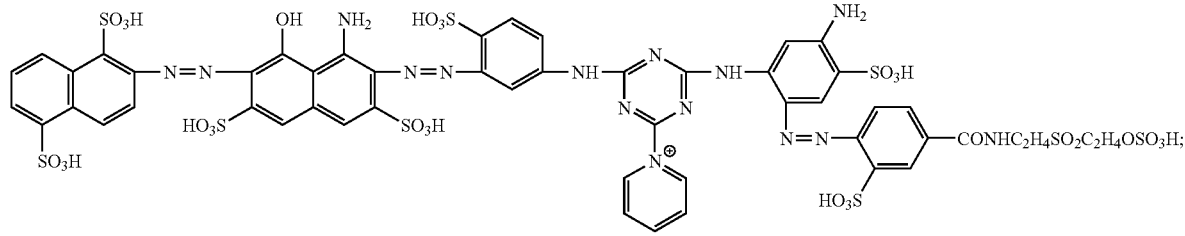

(8)

the reactive dyestuff of formula (9) below.

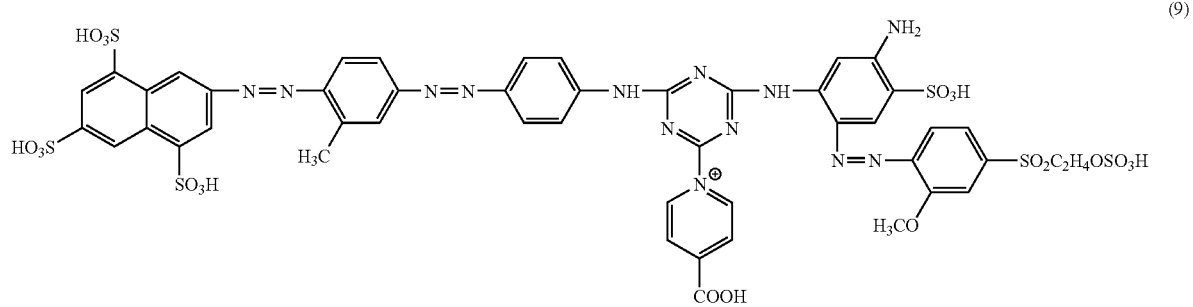

(9)

For convenience in the statement of the present invention, the compounds are expressed as free acid in the specification. When the dyestuffs of the present invention are manufactured or used, they often exist in the form of water soluble salts, suitable salts may be alkaline metallic salts, alkaline earth metals, ammonium salts or organic amine, wherein preferably they are sodium salts, potassium salts, lithium salts, ammonium salts or triethanolamine salts.

DETAILED DESCRIPTION OF THE PREFERRED EMBODIMENT

The dyestuffs of the present invention may be prepared by conventional methods, and in the preparation the reaction sequence are not critically limited. For example the chromophore group may be prepared in advance and then synthesize to obtain the desired dyestuffs; it is also applicable to synthesize the chromophore group in the course of the dyestuff preparation. The methods for preparing chromophore group in advance and synthesizing as dyestuff after may be exemplified as follow:

a) A compound of the following formula (A) is reacted with a halotriazine of the following formula (B) to undergo a condensation reaction. The obtained product is then further proceed a second condensation reaction with D-NHR$_2$ compound (D and R$_2$ are defined the same as the above). The product of the second condensation reaction is reacted with a diazonium salt of Z-NH$_2$ to undergo a coupling reaction, lastly the obtained product is reacted with a desired compound X to proceed a third condensation reaction. Then, a dyestuff of formula (I) is obtained.

Similarly, the D-NHR$_2$ compound (D and R$_2$ are defined the same as the aforementioned) may be obtained first and undergoing a condensation reaction with halotriazine of the following formula (B), the obtained product is then further proceed a second condensation reaction with the compound of the following formula (A). After, along with the diazonium salt of Z-NH$_2$ (Z is defined the same as the aforementioned) the obtained product undergoes coupling reaction, lastly the obtained product with a desired compound X a third condensation reaction is carried out to obtain the dyestuff of formula (I).

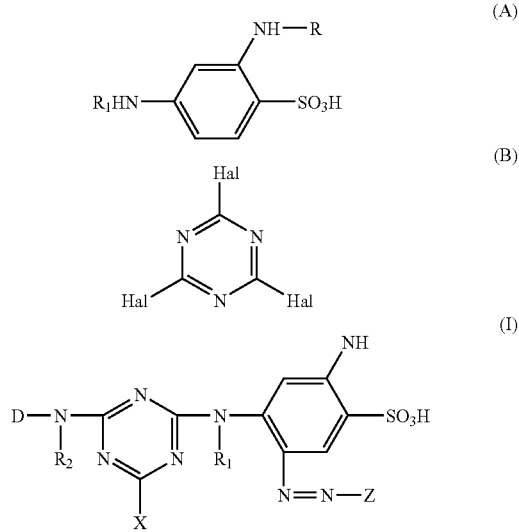

wherein Hal is halogen, such as fluorine, chlorine, bromine atom; X, Z, D, R, R$_1$ and R$_2$ are defined the same as the aforementioned.

b) The diazonium salt of Z-NH$_2$ (Z is defined the same as the aforementioned) is reacted with a compound of formula (A) to proceed a coupling reaction. The obtained product together with halotriazine of formula (B) a condensation reaction is carried out. The obtained product is then further proceed a second condensation reaction with D-NHR$_2$ compound (D and R$_2$ are defined the same as the aforementioned). Lastly the obtained product with a proper compound X a third condensation reaction is carried out to obtain the dyestuff of formula (I).

Else, the D-NHR$_2$ compound (D and R$_2$ are defined the same as the aforementioned) may be obtained first and undergoing a condensation reaction with halotriazine of the following formula (B). The obtained product is then further undergoing a coupling reaction with the diazonium salt of Z-NH$_2$ (Z is defined the same as the aforementioned) and the compound of formula (A), the product obtained from the previous reaction is then proceeds with a second condensation reaction. Lastly with a desired compound X the obtained product undergoes a third condensation reaction to obtain the dyestuff of formula (I).

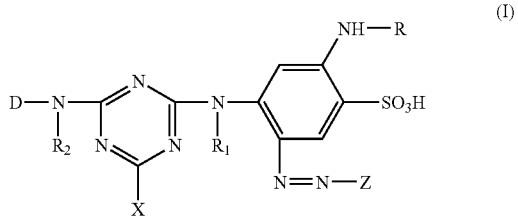

wherein X, Z. D, R, R I and R$_2$ are defined the same as the above.

c) A compound of the following formula (A) is reacted with a halotriazine of the following formula (B) to undergo a condensation reaction. The obtained product is then further proceed a second condensation reaction with D-NHR$_2$ compound (D and R$_2$ are defined the same as the above). The product of the second condensation reaction is reacted with a desired compound X to undergo a coupling reaction, lastly the obtained product is reacted with a diazonium salt of Z-NH$_2$ to proceed a third condensation reaction. Then, a dyestuff of formula (I) is obtained.

Similarly, the D-NHR$_2$ compound (D and R$_2$ are defined the same as the aforementioned) may be obtained first and undergoing a condensation reaction with halotriazine of the following formula (B), the obtained product is then further proceed a second condensation reaction with the compound of the following formula (A). Follow up the obtained product with a proper compound X a third condensation reaction is carried out; lastly the obtained product undergoes coupling reaction with diazonium salt of Z-NH$_2$ to obtain the dyestuff of formula (I).

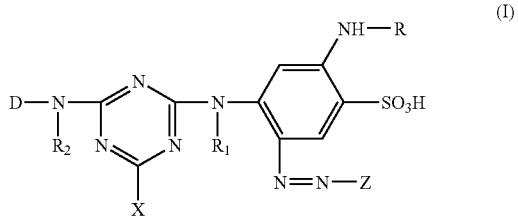

wherein X, Z, D, R, R$_1$ and R$_2$ are defined the same as the above.

In the course of preparing dyestuffs of the present invention, the reaction methods used are under the commonly practiced reaction conditions. For example the coupling reaction is carried out under weak acidic to neutral pH at temperatures of 0~25° C.; and the first condensation reaction with halotriazine is carried out under acidic to neutral pH, such as a pH value between 1 to 7 and at a low temperature such as temperatures of 0~10° C.; the second condensation reaction with halotriazine is carried out under weak acidic to neutral pH, such as a pH value between 4.5 to 7.5 and at an intermediate temperature such as temperatures of 30~60° C.; the third condensation reaction with halotriazine is carried out under weak acidic to neutral pH, such as a pH value between 4.5 to 7.5 and at an elevated temperature such as temperatures of 70~100° C.

The dyestuffs of the present invention can dye and print on many kinds of fiber materials such as cellulose fiber materials and cellulose included fiber materials. These dyestuffs can also be used to dye natural cellulose fibers and regenerated cellulose fibers, such as cotton, hemp, linen, jute, ramie, mucilage rayon, as well as cellulose based fibers. Similarly the dyestuffs of the present invention are also suitable for dyeing or printing fibers which contain hydroxy groups and are contained in blended fabrics. They are also distinguished by low substantivity and high exhaustion, and they are suitable for dyeing and printing of materials containing either cellulose fibers, such as cotton, synthetic cotton, hemp, and synthetic hemp. Materials of high light and wet fastness can be obtained. Also materials of good fastness to other agencies can be obtained The dyestuffs according to the invention can be applied to the fiber material and fixed on the fiber in various ways, in particular in the form of aqueous dyestuff solutions and printing pastes. The method of dyeing or printing may be carried out by exhaustion dyeing, continuous dyeing, cold batch-up dyeing and printing.

The dyeing or printing of the dyestuffs of the present invention can be preceded by usual or known method. Exhaustion dyeing is applied by using usual inorganic salts (e.g. sodium sulfate and sodium chloride) and well-known acid-binding agents (e.g. sodium carbonate, sodium hydroxide). The amount of inorganic salts and alkali here is not important. Inorganic salts and alkali can be added into the dyeing bath through traditional methods either by once or by several times. In addition, dyeing assistants can be added, too. The range of dyeing temperature is from 40° C. to 90° C. Preferably, the temperature for dyeing is from 40° C. to 70° C.

In a cold-pad-batch application, dye, alkali and customary auxiliaries are padded from the liquor through. The padded, squeezed substrate is often rolled onto an A-frame and batched at room temperature to allow dye fixation to take place.

In a continuous dyeing, it can be divided into two different methods. In the one-bath padding application, dye, alkali (e.g. sodium carbonate or sodium bicarbonate) and customary auxiliaries are padded from the liquor through, the padded, squeezed substrate was then dried by either baking or steam. In the two bath padding application, the substrate is padded through a dye solution bath, pre-dried, an alkali (e.g. sodium sulfate or sodium silicate) bath, then dye fixed by either baking or steam.

In textile printing, there can be exemplified a method which conducts printing a substrate with a printing paste containing, a well-known acid-binding agent (e.g. sodium bicarbonate), thickener, and completing the dye fixation by dry heat or steam. The dyeing or printing methods employed in the process of the present invention are not limited to these methods.

The dyestuff of the present invention is a valuable reactive dyestuff for cellulose fiber materials in the present dyeing industry. The dye compositions have the materials dyed with excellent fixing capacity and outstanding build up while having high wash-off and is suitable to dye in a wide range of temperatures, therefore it is also suitable for dyeing cotton/polyester blended fabrics. The dyestuff of the present invention is also suitable for printing, particularly suitable for the use with cotton or blended fabrics which contain wool or silk. In the dyeing or printing of cellulose fiber materials, dyed cloths having various fine dyeing properties are obtained; particularly in build up, wash fastness and chlorine bleaching fastness and resulting high quality dyeing, printing or batch-up dyeing products.

Many examples have been used to illustrate the present invention. The examples sited below should not be taken as a limit to the scope of the invention. Wherein the compounds are represented in the form of free acid. However, in practice, they often exist as metallic salts, and most likely alkaline metallic salts, particularly sodium salts. In the following examples, if it is not specifically indicated the parts and percent used are based on weight, and the temperature is in degree Celsius (° C.).

EXAMPLE 1

19.17 parts of 7-amino-1,3,6-trisulfonic acid-naphthalene are evenly dispersed in 70 parts of water, and are followed by using 4.3 parts of $Na_2CO_3$ to fully dissolve and to adjust the pH to a neutral value. Subsequently the reacting solution undergoes diazotization by the addition of 3.6 parts of sodium nitrite and 15 parts of 32% HCl aqueous solution at a temperatures of 5~10° C. On the other hand 7.8 parts of m-Aminophenyl urea are evenly dispersed in 50 parts of water, and are added to the afore prepared diazonium component while maintaining temperatures in between 8~10° C., with the addition of soda ash aqueous solution the pH value is further adjusted to 5~7 and coupling reaction is carried after. After the reaction is completed 9.5 parts of cyanuric chloride dispersed in ice water are added to the afore solution while maintaining temperatures in 5~8° C. and a pH value between 5~7. After the reaction is completed 12.8 parts of 2,4-diamino-1-benzenesulfonic acid are added to the afore reacting solution while maintaining a pH value between 5~7 and temperatures in between 40~60° C. After the reaction is completed 6.8 parts of 4-carboxypyridinium are added to the afore reacting solution while maintaining a pH value between 5~7 and temperatures in between 80~100° C., and after reaction completion it is cooled to 7~10° C. Follow up 18 parts of 2-sulfonic acid-4-(2-sulfatoethylsulfonyl)aniline undergoes diazotization by the prac- ticed known method and the diazotized salt is added to the afore reacting solution where the pH is adjust to 6.0. After reaction is completed, the obtained solution is filter and dried to obtain the dyestuff of the following formula (1), and after dyed a golden-yellow dyed material with fine properties can be obtained.

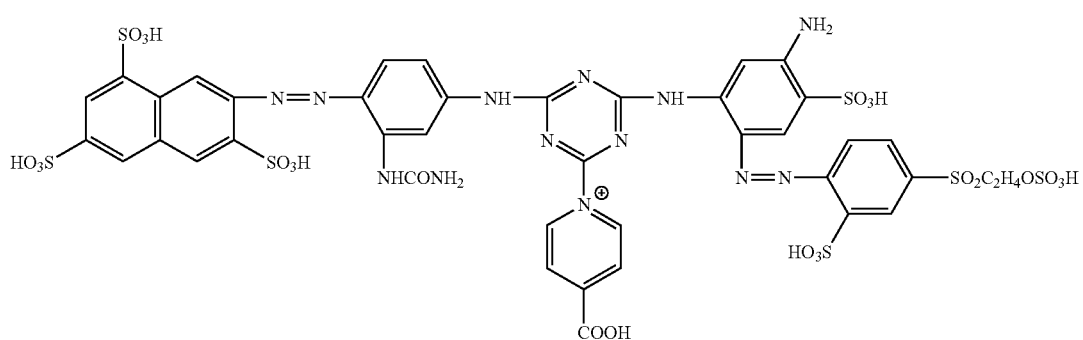

(1)

EXAMPLE 2

15.6 parts of 1-amino-3,6-disulfo-8-hydroxy-naphthalene are added to 20 parts of water, and for fully dissolve the pH is adjust to 6.5-7.0, follow up the temperature of the solution is lower to 5° C. and 6.7 parts of acetic anhydride are then added and stirred till the reaction is completed.

On the other hand 11.2 parts of 2-amino-naphthyl sulfonic acid undergoes diazotization by the practice known methods, and the aforementioned solution is then poured into this diazotized solution where then the pH is adjusted to 7~8. After confirming the completion of the reaction, the pH is further adjusted to 12~13 and the temperature is elevated to 70~90° C., after the reaction has completed 50 parts of sodium chloride are added and the pH is adjusted to 6.8~7.2 and filtered after.

The wet cake is dissolved in 1,000 parts of water, and immediately after it is poured into 8.7 parts of cyanuric chloride solution which are readily dissolved in 30 parts of ice water prior while maintaining the pH at 6~7 and at temperatures of 5~8° C. After the reaction is completed 11.6 parts of 4-amino-2-(2-hydroxyethyl)amino benzene sulfonic acid are further added while maintaining the pH at 5~7 and elevating the temperature to 40~60° C. After the reaction has completed 6.8 parts of 3-carboxypyridinium are mixed with the aforementioned reacting solution while maintaining the pH at 5~7 and at temperatures of 80~100° C., where then it is cooled down to 7~10° C. after the reaction has completed. 18 parts of 2-sulfonic acid-4-(2-sulfatoethylsulfonyl)aniline are then undergoes diazotization by the practiced known method and the diazotized salt is added to the afore solution where the pH is adjust to 6.0. After the reaction has completed, the obtained solution is filter and dried to obtain the dyestuff of the following formula (2), and after dyed a pink-red dyed material with fine properties can be obtained.

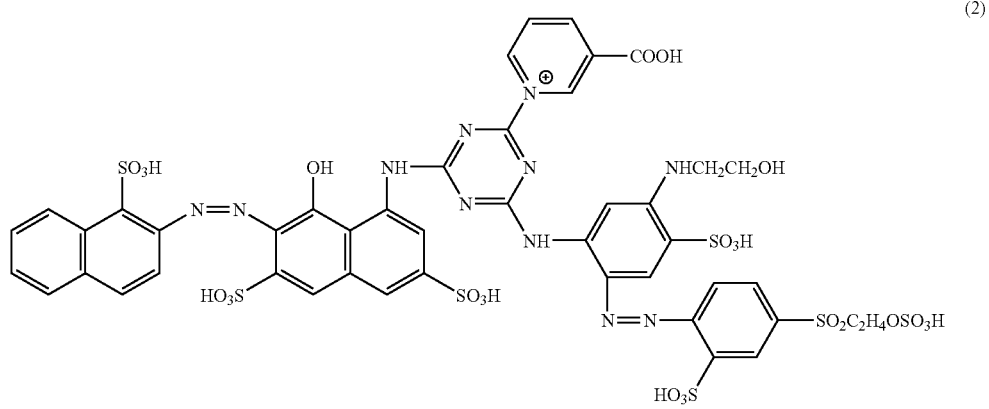

(2)

EXAMPLE 3

19.17 parts of 7-amino-1,3,6-trisulfonic acid-naphthalene are evenly dispersed in 70 parts of water, and is followed by using 4.3 parts of soda ash ($Na_2CO_3$) to fully dissolve and to adjust the pH to a neutral value. Subsequently the reacting solution undergoes diazotization by the addition of 3.6 parts of sodium nitrite and 15 parts of 32% HCl aqueous solution at temperatures of 5~10° C. On the other hand 7.8 parts of m-Aminophenyl urea are evenly dispersed in 50 parts of water, and are added to the afore prepared diazotized component while maintaining temperatures in between 8~10° C., with the addition of soda ash aqueous solution the pH is further adjusted to 5~7 and coupling reaction is carried after. After the reaction has completed 9.5 parts of cyanuric chloride dispersed in ice water are added to the afore solution while maintaining temperatures in between 5~8° C. and a pH value between 5~7. After the reaction has completed 12.87 parts of 4-amino-2-(2-carboxyethyl)amino benzene sulfonic acid are added to the afore reacting solution while maintaining a pH value between 5~7 and temperatures in between 40~60° C. After the reaction has completed 6.74 parts of 3-carbamolylpyridinium are added to the afore reacting solution while maintaining a pH value between 5~7 and temperatures in between 80~100° C., and after completing this reaction it is cooled to 7~10° C. Follow up 18 parts of 2-sulfonic acid-4-(2-sulfatoethylsulfonyl)aniline undergoes diazotization by the practiced known methods and the diazotized salt is added to the afore reacting solution where the pH is adjust to 6.0. After reaction is completed, the obtained solution is filter and dried to obtain the dyestuff of the following formula (3), and after dyed a golden-yellow dyed material with fine properties can be obtained.

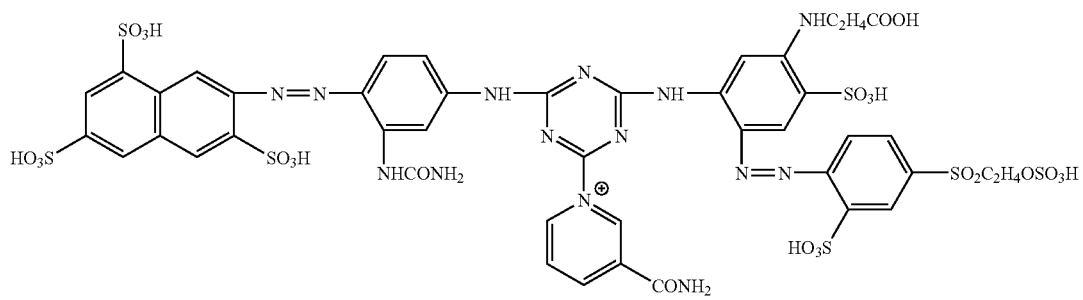

(3)

In general the following examples 4 to 13 are based on the procedures of example 1, example 2 and example 3, and the following reactive dyestuffs of formula (4) to (13) can be prepared with good fastness property.

EXAMPLE 4
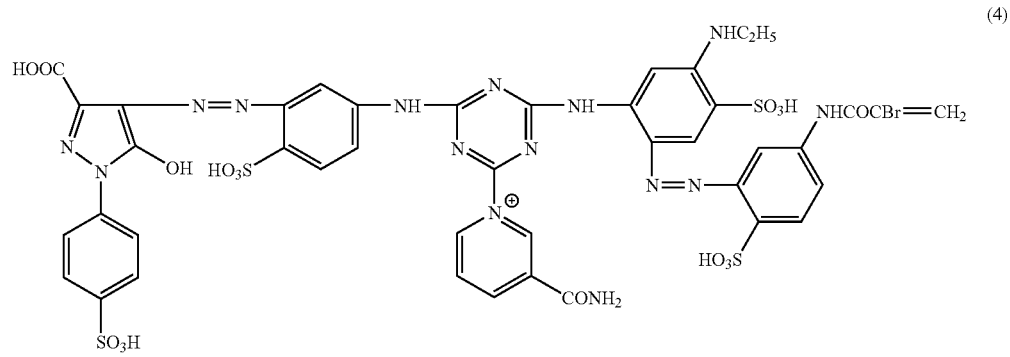
(4)
EXAMPLE 5
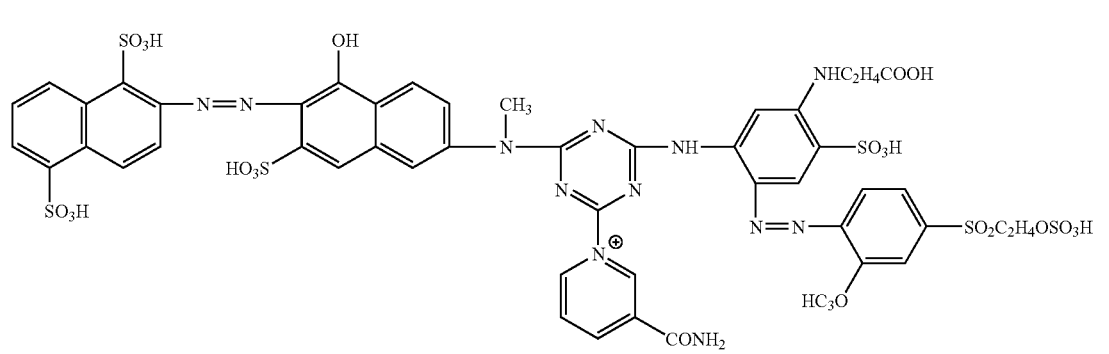
(5)
EXAMPLE 6
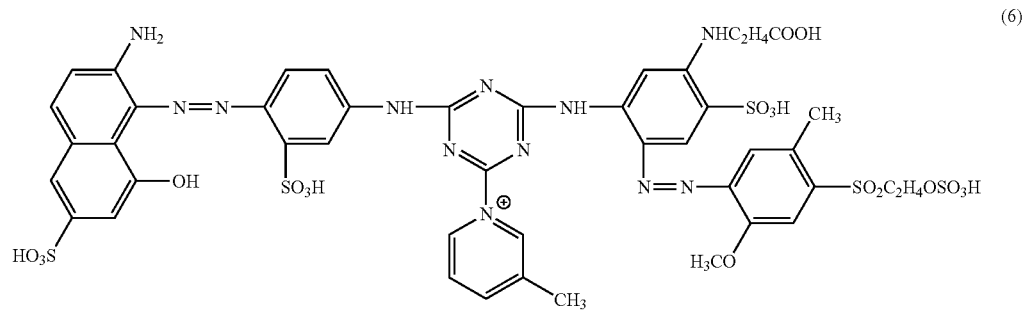
(6)

EXAMPLE 7
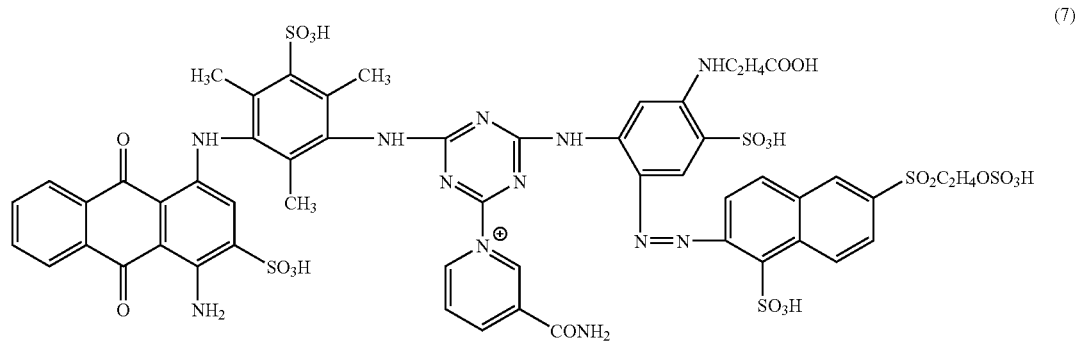
(7)
EXAMPLE 8
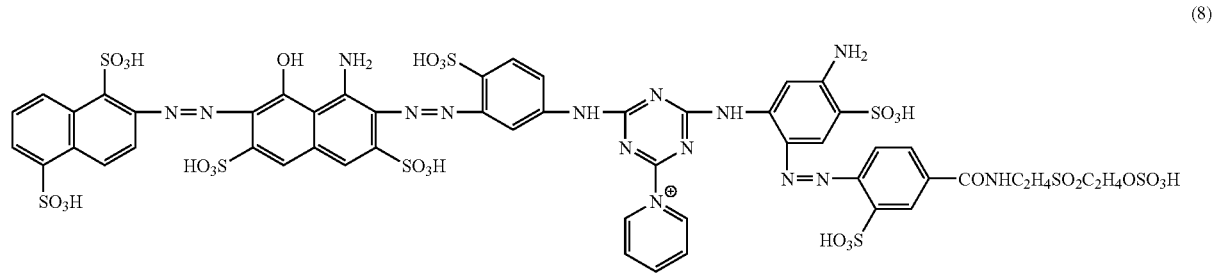
(8)
EXAMPLE 9
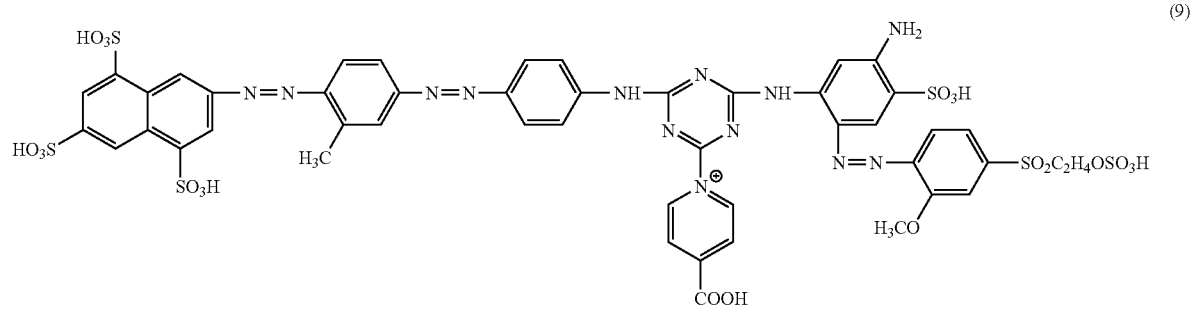
(9)

EXAMPLE 10
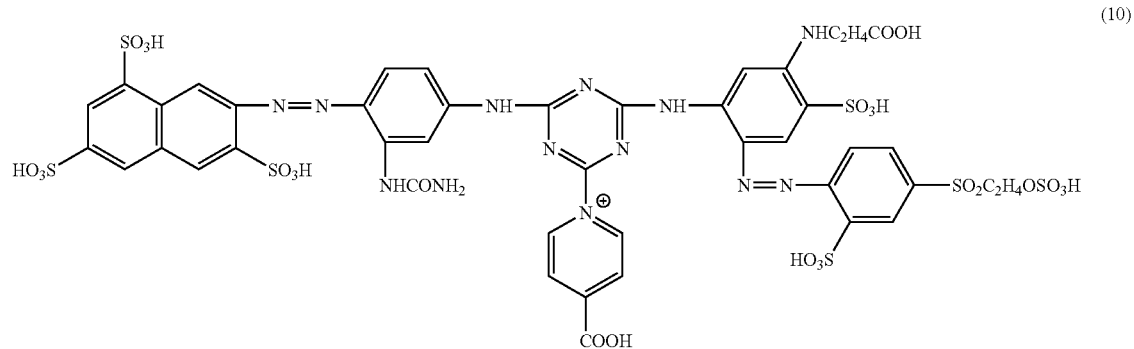
EXAMPLE 11
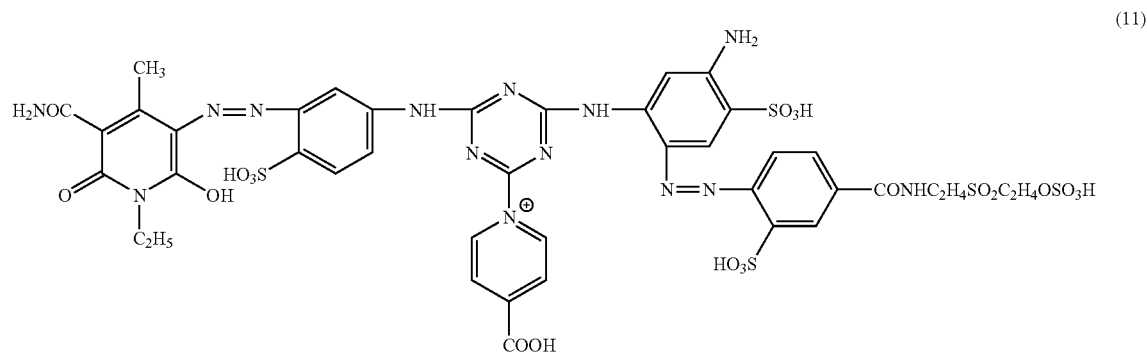
EXAMPLE 12
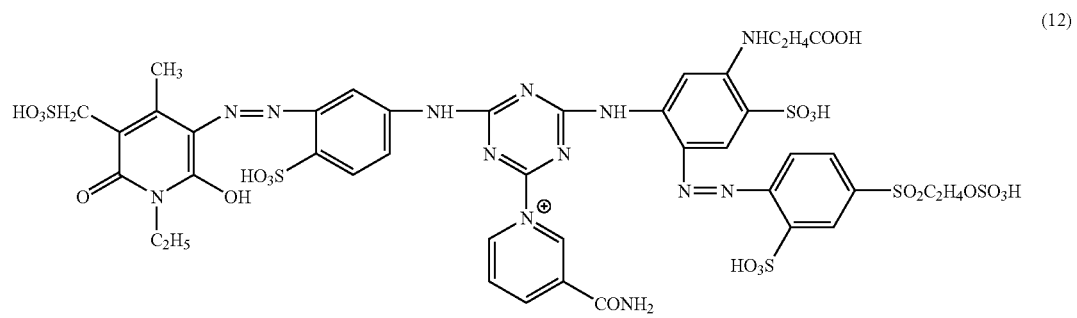

EXAMPLE 13

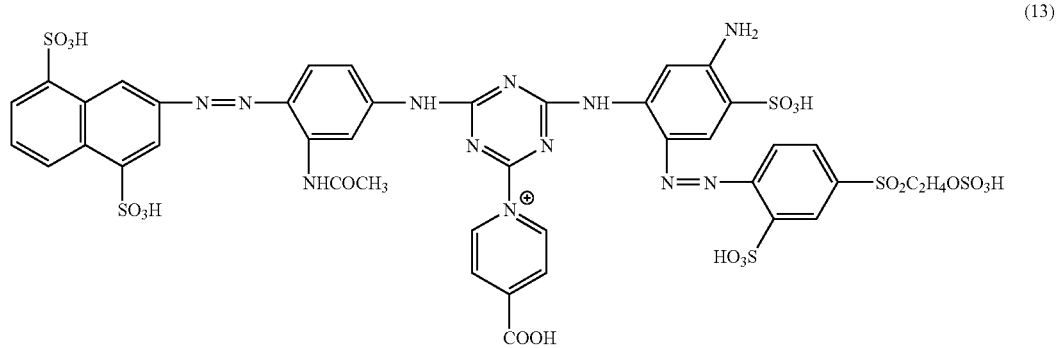

(13)

EXAMPLE 14

Urea 100 parts, m-nitrobenzene sulfonic acid sodium salt 10 parts, sodium bicarbonate 20 parts, sodium alginate 55 parts and lukewarm water 815 parts are stirred in a vessel to give a completely homogeneous printing paste.

Dyestuff prepared in example 1, 3 parts, and the above printing paste, 100 parts, are mixed together to make a homogeneous colored paste. A 100 mesh printing screen covering an adequate size piece of cotton fabric is then painted with this colored paste on printing screen to give a colored fabric.

This colored fabric is placed in an oven at 65° C. to dry for 5 minutes then it is taken out, and putted into a steaming oven using saturated steam for 10 minutes at 102~105° C.

The obtained golden-yellow fabric is washed with cold water, hot water, soap water, and again with cold water then dried to obtain a golden-yellow fabric with good build up and good tinctorial ratio.

EXAMPLE 15

3 parts of the dyestuff prepared in example 1 are dissolved in 100 parts of water to give a 30 parts/l padding liquor. 25 ml of alkali solution (NaOH(38° Be') 15 ml/l and Glauber's salt 30 parts/l) are added to the padding liquor and stirred evenly. The resultant solution is then putted into a pad roller machine. The cotton fabric is padded by the roller pad machine, then batched for 4 hours under room temperature. The obtained golden-yellow fabric is washed with cold water, hot water, soap water, and again with cold water then dried to obtain a golden-yellow fabric with good build up and good tinctorial ratio.

EXAMPLE 16

0.25 parts of the dyestuff as prepared in example 1 are dissolved in 250 mL of water to prepare a mother liquid. To 40 mL of this mother liquid, in a dyeing bottle, is added cotton fabric, 2 parts, Glauber's salt, 2.4 parts, and 32% alkali solution, 2.5 mL. The dyeing bottle is shaken at 60° C. for 60 minutes while maintaining the temperature. The obtained golden-yellow fabric is washed with cold water, hot water, soap water, and again with cold water then dried to obtain a golden-yellow fabric with good build up and good tinctorial ratio.

EXAMPLE 17

0.25 parts of the dyestuff as prepared in example 2 is dissolved in 250 mL of water to prepare a mother liquid. To 40 mL of this mother liquid, in a dyeing bottle, is added cotton fabric, 2 parts, Glauber's salt, 2.4 parts, and 32% alkali solution, 2.5 mL. The dyeing bottle is shaken at 60° C. for 60 minutes while maintaining the temperature. The obtained golden-yellow fabric is washed with cold water, hot water, soap water, and again with cold water then dried to obtain a golden-yellow fabric with good build up and good tinctorial ratio.

EXAMPLE 18

0.25 parts of dyestuff prepared as in example 3 is dissolved in 250 mL of water to prepare a mother liquid. To 40 mL of this mother liquid, in a dyeing bottle, is added cotton fabric, 2 parts, Glauber's salt, 2.4 parts, and 32% alkali solution, 2.5 mL. The dyeing bottle is shaken at 60° C. for 60 minutes while maintaining the temperature. The obtained golden-yellow fabric is washed with cold water, hot water, soap water, and again with cold water then dried to obtain a golden-yellow fabric with good build up and good tinctorial ratio.

The fiber reactive dyestuffs of the present invention are dye compositions suitable for common use and can be used to dye cellulose fibers with excellent properties. The practiced dyeing methods are the common methods for dyeing reactive dyestuffs, examples of are exhaustion dyeing, printed-dyeing, or continuous dyeing.

The series of fiber reactive dyestuffs described in the present invention are water-soluble dyestuffs having high commercial value. The dye compositions of the present invention can obtain dyeing results with excellent properties in all aspects, especially in washing off, build-up, levelness, wash fastness, light fastness, rubbing fastness, ironing fastness and chlorine bleaching fastness.

From the foregoing description, regardless of the objects, the techniques, the effects or the skill aspects and developments, the present invention is distinctive with respect to known skills. Although the present invention has been explained in relation to its preferred embodiment, it is to be understood that many other possible modifications are variations can be made without departing from the scope of the invention as hereinafter claimed.

What is claimed is:

1. A fiber reactive dyestuff of formula (I),

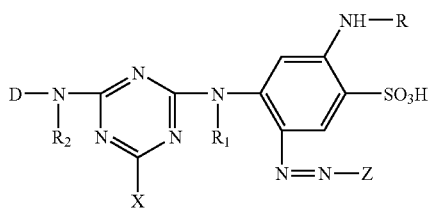

wherein
Z is

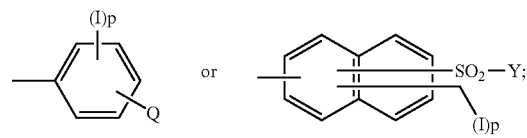

X is quaternary ammonium salt, pyridine, 3-carboxypyridine-1-yl, 4-carboxypyridin-1-yl, methylpyridinium, or carbamoylpyridinium;

Y is —OH, vinyl or —CH$_2$—CH$_2$—W, wherein W is a leaving group which is eliminable by a base;

I is sulfo, C$_{1-4}$ alkyl, C$_{1-4}$ alkoxyl or C$_{1-4}$ alkoxycarbonyl; p is 0, 1, 2 or 3; Q is —SO$_2$—Y, —CONH—(CH$_2$)$_n$—SO$_2$—Y, —(O)$_o$—(CH$_2$)$_m$—CONH—(CH$_2$)$_n$—SO$_2$—Y, or —NH—CO-T, wherein Y is defined as the aforementioned, T is α, β-dihalopropionyl or α-haloacryloyl, n and m are independently of one another an integer between 1 to 6; p is defined as the aforementioned; o is 0, 1, 2 or 3; R, R$_1$ and R$_2$ are each independently of one another a hydrogen atom, C$_{1-4}$ alkyl, or C$_{1-4}$ alkyl substituted by a halogen atom, hydroxyl, cyano, C$_{1-4}$ alkoxyl, C$_{1-4}$ alkoxycarbonyl, carboxyl, sulfo, or sulfato;

when R is a hydrogen atom, X is quaternary ammonium salt, pyridine, 4-carboxypyridin-1-yl or methylpyridinium;

when R is —CH$_2$CH$_2$COOH, X is quaternary ammonium salt, pyridine, methylpyridinium or carbamoylpyridinium; and D is a chromophore group having one or more reactive or non-reactive groups, wherein said one or more reactive groups are each independently selected from the Q groups set forth above, and said chromophore group is selected from the group consisting of formazan chromophore, anthraquinone, phthalocyanine, triphendioxazine, monoazo, polyazo, and metal complex azo.

2. The fiber reactive dyestuff of claim 1, wherein said formazan chromophore is

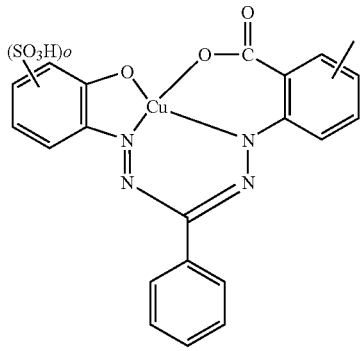

or

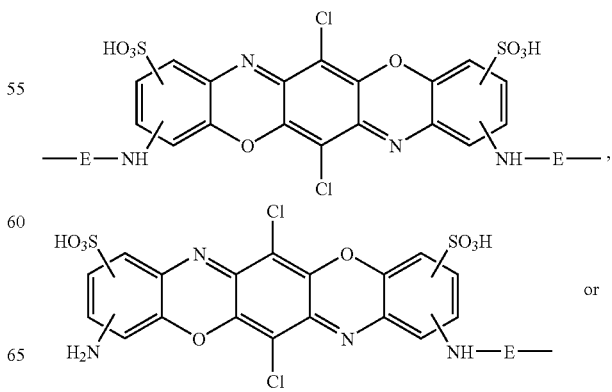

wherein p and o are defined in claim 1.

3. The fiber reactive dyestuff of claim 1, wherein said anthraquinone is

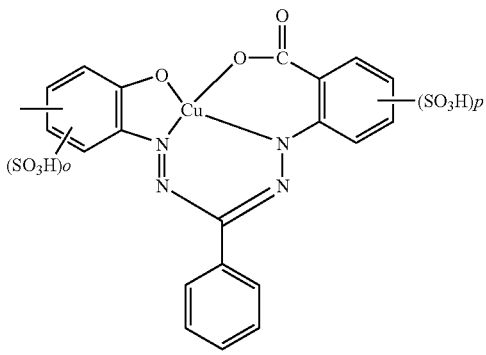

wherein G is phenylene substituted by C$_{1-4}$ alkyl or sulfo.

4. The fiber reactive dyestuff of claim 1, wherein said plithalocyanine is

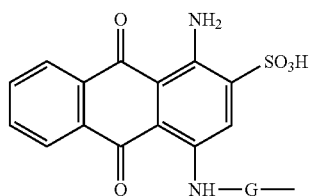

wherein Pc is copper phthalocyanine or nickel phthalocyanine-. W' is —OH or —NH$_2$; B is phenylene or ethylene; and o is defined in claim 1.

5. The fiber reactive dyestuff of claim 1, wherein said triphendioxazine is

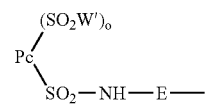

or

-continued

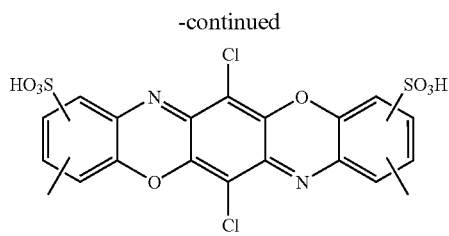

wherein E phenylene or ethylene.

6. The fiber reactive dyestuff of claim 1, wherein said monoazo is

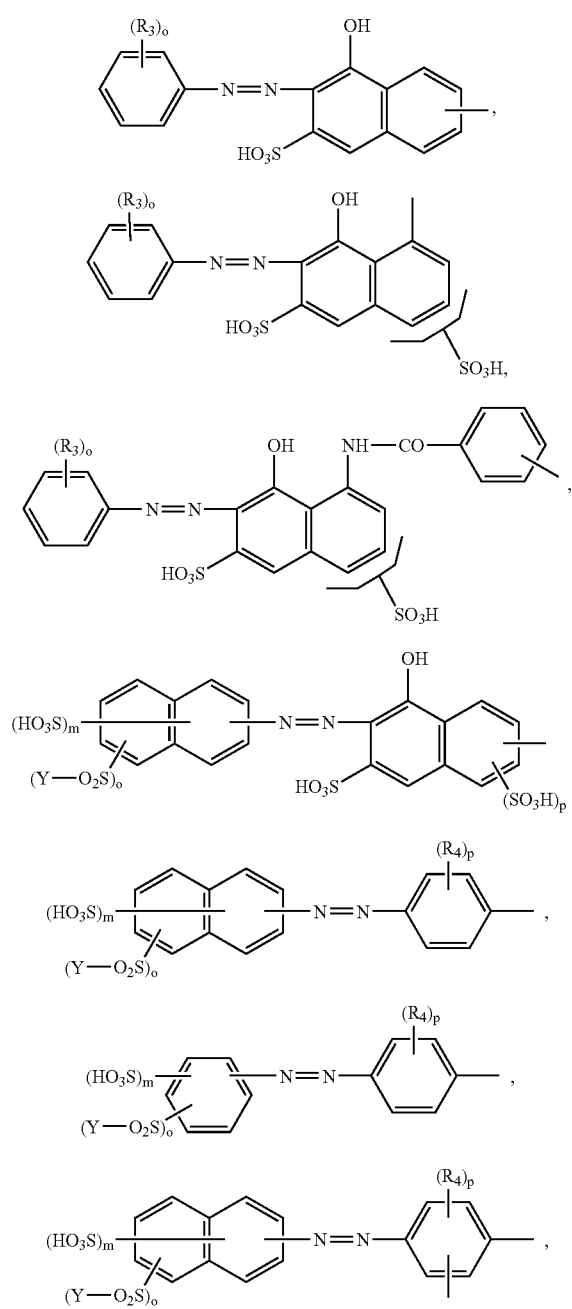

-continued

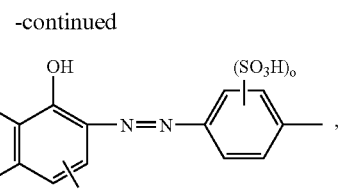

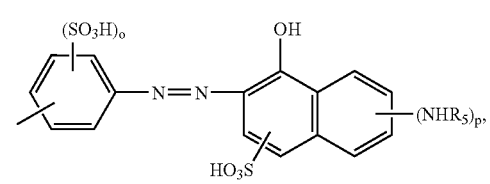

wherein
- $R_3$ is $C_{1-4}$ alkyl, $C_{1-4}$ alkoxyl, carboxyl, sulfo or —$SO_2$—Y, Y being defined in claim 1;
- $R_4$ is $C_{1-4}$ alkyl, $C_{1-4}$ alkoxyl, amino, acetylamino, ureido or sulfo;
- $R_5$ is $C_{1-4}$ alkanoyl or benzoyl;
- $R_6$ is $C_{1-4}$ alkyl or carboxyl;
- $R_7$ and $R_8$ are $C_{1-4}$ alkyl;
- $R_9$ is hydrogen, carbamoyl or sulfomethyl and m n, o and p are defined in claim 1.

7. The fiber reactive dyestuff of claim 1, wherein said polyazo is

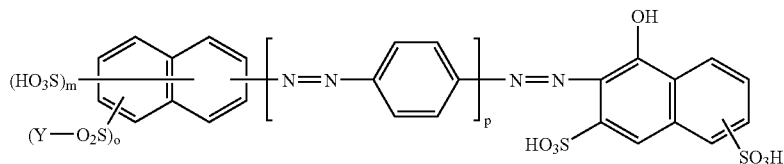

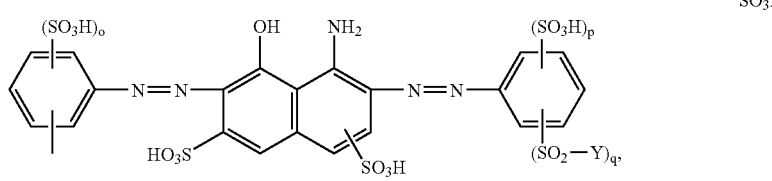

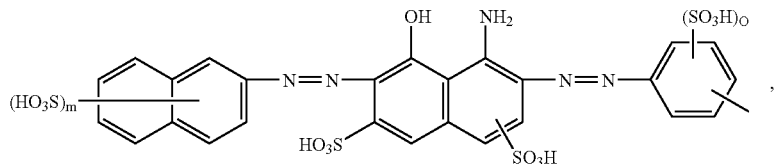

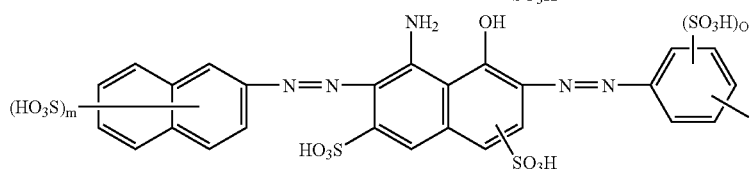

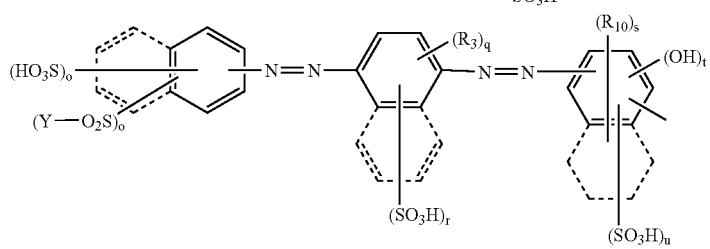

wherein $R_{10}$ is $C_{1-4}$ alkyl, $C_{1-4}$ alkoxyl, carboxyl, sulfo, acetyl, acetylamino, ureido or $-SO_2-Y$;

q, r, s, t and u each independently are 0, 1, 2 or 3;

$R_3$ is $C_{1-4}$ alkyl, $C_{1-4}$ alkoxyl, carboxyl, sulfo or $-SO_2-Y$; and

Y, m, n, o and p are defined in claim 1.

8. The fiber reactive dyestuff of claim 1, wherein said formula (I) is formula (Ia)

(Ia)

wherein D, X, Q, I, R, $R_1$, $R_2$ and p are defined in claim 1.

9. The fiber reactive dyestuff of claim 1, wherein said formula (I) is formula (Ib)

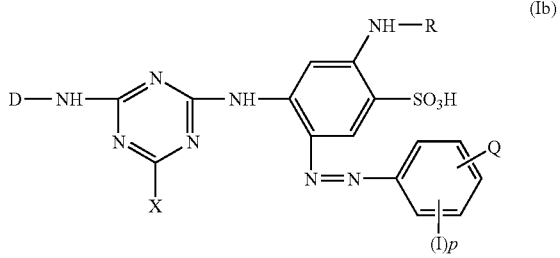

wherein D, X, Q, I, R and p are defined in claim 1.

10. The fiber reactive dyestuff of claim 1, wherein said formula (I) is formula (Ic)

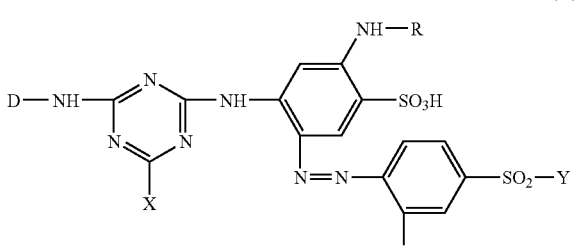

wherein D, X, R and Y are defined in claim 1.

11. A fiber reactive dyestuff of formula (I):

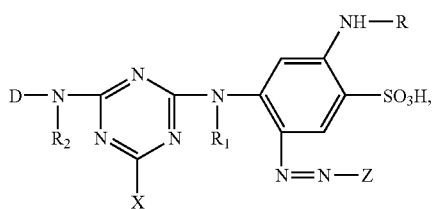

wherein Z is

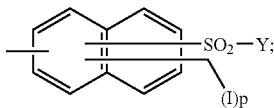

X is a halogen atom, quaternary ammonium salt, pyridine, 3-carboxypyridine-1-yl, 4-carboxypyridin-1-yl, methylpyridinium, or carbamoylpyridinium;

Y is —OH, vinyl or —CH$_2$—CH$_2$—W, wherein W is a leaving group which is eliminable by a base;

I is sulfo, C$_{1-4}$ alkyl, C$_{1-4}$ alkoxyl or C$_{1-4}$ alkoxycarbonyl: p is 0, 1, 2 or 3; Q is —SO$_2$—Y, —CONH—(CH$_2$)$_n$—SO$_2$—Y, —(O)$_o$—(CH$_2$)$_m$—CONH—(CH$_2$)$_n$—SO$_2$—Y, or —NH—CO-T, wherein Y is defined as the aforementioned, T is α, β-dihalopropionyl or α-haloacryloyl, n and m are independently of one another an integer between 1 to 6; p is defined the same as the aforementioned; o is 0, 1, 2 or 3; R, R$_1$ and R$_2$ are each independently of one another a hydrogen atom, C$_{1-4}$ alkyl, or C$_{1-4}$ alkyl substituted by a halogen atom, hydroxyl, cyano, C$_{1-4}$ alkoxyl, C$_{1-4}$ alkoxycarbonyl, carboxyl, sulfo, or sulfato;

when R is a hydrogen atom, X is quaternary ammonium salt, pyridine, 4-carboxypyridin-1-yl or methylpyridinium;

when R is —CH$_2$CH$_2$COOH, X is quaternary ammonium salt, pyridine, methylpyridinium or carbamoylpyridinium; and D is a chromophore group having one or more reactive or non-reactive groups, wherein said one or more reactive groups are each independently selected from the Q groups set forth above, and said chromophore group is selected from the group consisting of formazan chromophore, anthraquinone, phthalocyanine, triphendioxazine, monoazo, polyazo, and metal complex azo.

12. A fiber reactive dyestuff of formula (I):

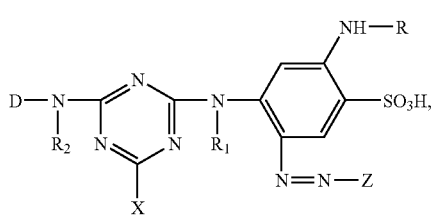

wherein Z is

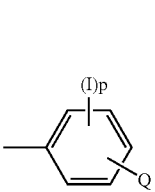 or 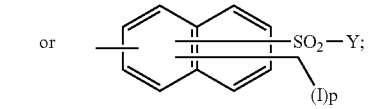

X is a halogen atom, quaternary ammonium salt, pyridine, 3-carboxypyridine-1-yl, 4-carboxypyridin-1-yl, methylpyridinium or carbamoylpyridinium;

Y is —OH, vinyl or —CH$_2$—CH$_2$—W, wherein W is a leaving group which is eliminable by a base;

I is sulfo, C$_{1-4}$ alkyl, C$_{1-4}$ alkoxyl or C$_{1-4}$ alkoxycarbonyl; p is 0, 1, 2 or 3; Q is —SO$_2$—Y, —CONH—(CH$_2$)$_n$—SO$_2$—Y, —(O)$_o$—(CH$_2$)$_m$—CONH—(CH$_2$)$_n$—SO$_2$—Y, or —NH—CO-T, wherein Y is defined as the aforementioned, T is α, β-dihalopropionyl or α-haloacryloyl, n and m are independently of one another an integer between 1 to 6; p is defined the same as the aforementioned; o is 0, 1, 2 or 3; each of R$_1$ and R$_2$ is independently a hydrogen atom, C$_{1-4}$ alkyl, or C$_{1-4}$ alkyl substituted by a halogen atom, hydroxyl, cyano, C$_{1-4}$ alkoxyl, C$_{1-4}$ alkoxycarbonyl, carboxyl, sulfo, or sulfato; R is hydrogen atom, C$_{1-4}$ alkyl, or C$_{1-4}$ alkyl substituted by a halogen atom, cyano, C$_{1-4}$ alkoxyl, C$_{1-4}$ alkoxycarbonyl, carboxyl, sulfo, or sulfato;

when R is hydrogen atom, X is quaternary ammonium salt, pyridine, 4-carboxypyridin-1-yl or methylpyridinium;

when R is —CH$_2$CH$_2$COOH, X is quaternary ammonium salt, pyridine, methylpyridinium or carbamoylpyridinium; and D is a chromophore group having one or more reactive or non-reactive groups, wherein said one or more reactive groups are each independently selected from the Q groups set forth above, and said chromophore group is selected from the group consisting of formazan chromophore, anthraquinone, phthalocyanine, triphendioxazine, monoazo, polyazo, and metal complex azo.

13. The fiber reactive dyestuff of claim 1, wherein W is a chlorine atom, —OSO$_3$H, or

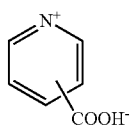

14. The fiber reactive dyestuff of claim 1, wherein Q is —SO$_2$—Y, or —CONH—(CH$_2$)$_n$—SO$_2$—Y.

15. The fiber reactive dyestuff of claim 1, wherein said formula (I) is formula (1):
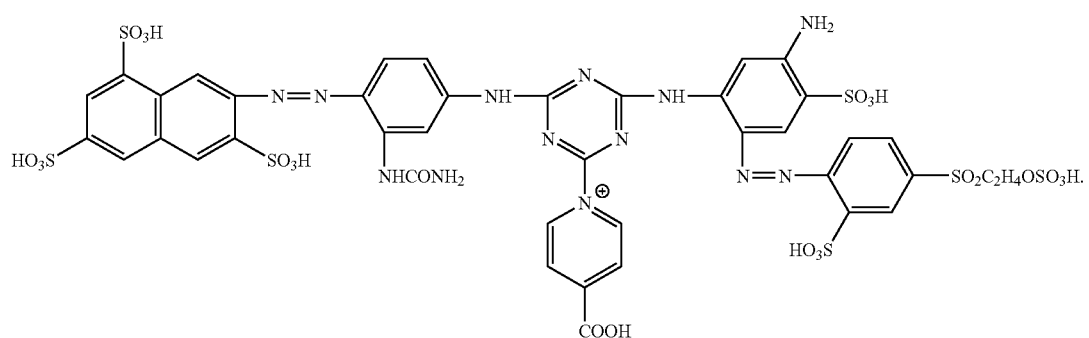
16. The fiber reactive dyestuff of claim 1, wherein said formula (I) is formula (2):
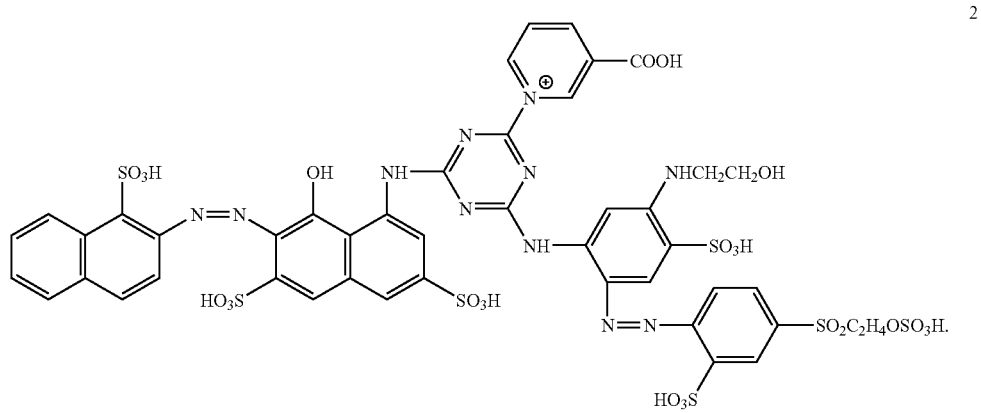
17. The fiber reactive dyestuff of claim 1, wherein said formula (I) is formula (3):
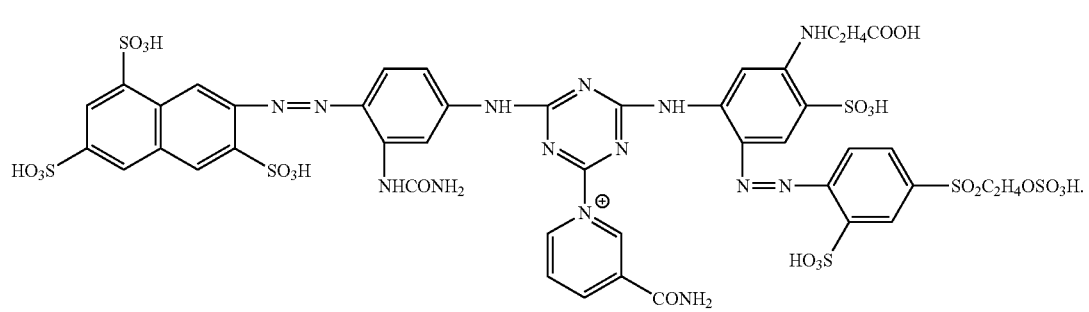

18. The fiber reactive dyestuff of claim 1, wherein said formula (I) is formula (4):
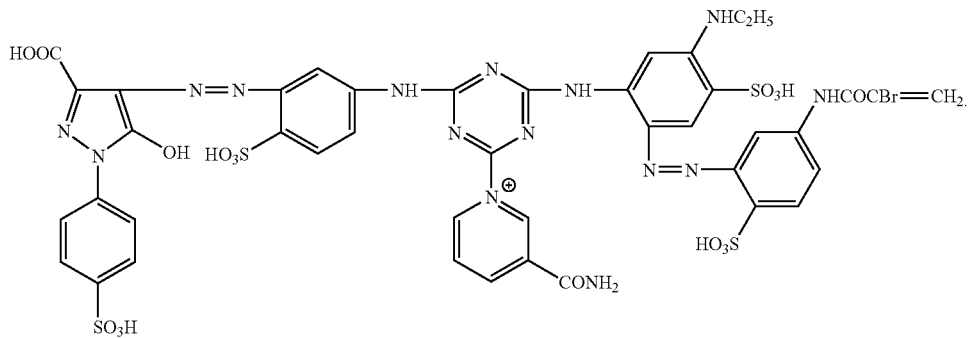
19. The fiber reactive dyestuff of claim 1, wherein said formula (I) is formula (5):
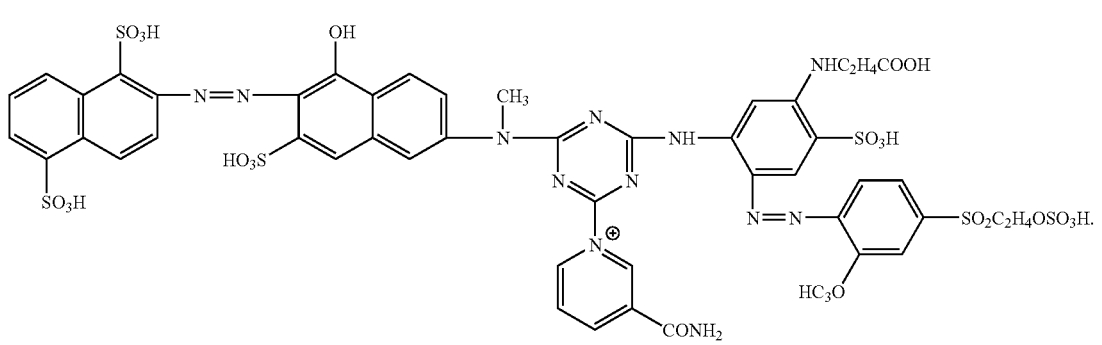
20. The fiber reactive dyestuff of claim 1, wherein said formula (I) is formula (6):
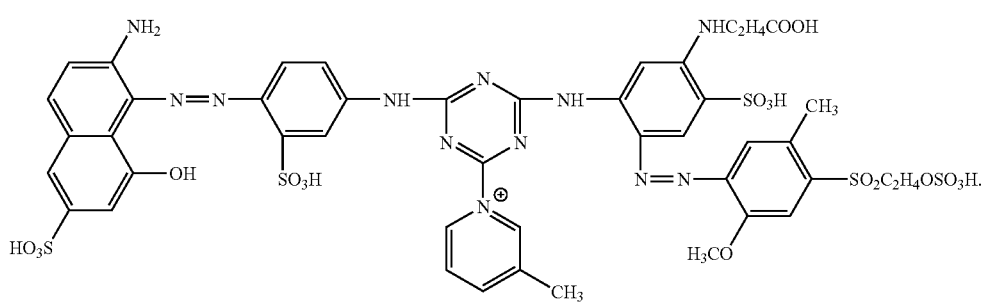

21. The fiber reactive dyestuff of claim 1, wherein said formula (I) is formula (7):
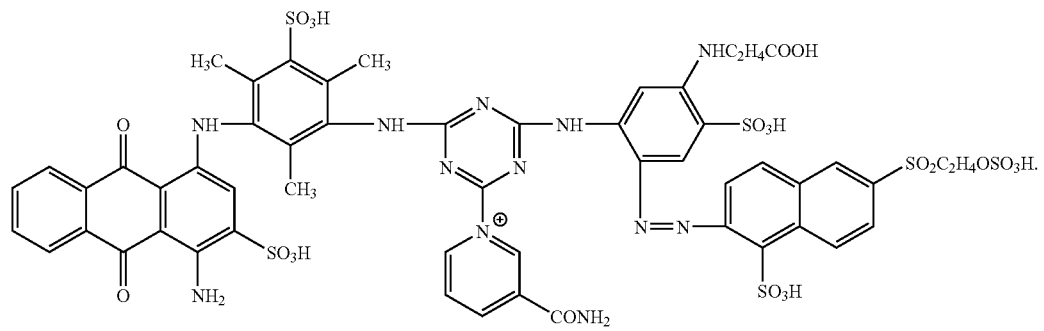
(7)
22. The fiber reactive dyestuff of claim 1, wherein said formula (I) is formula (8):
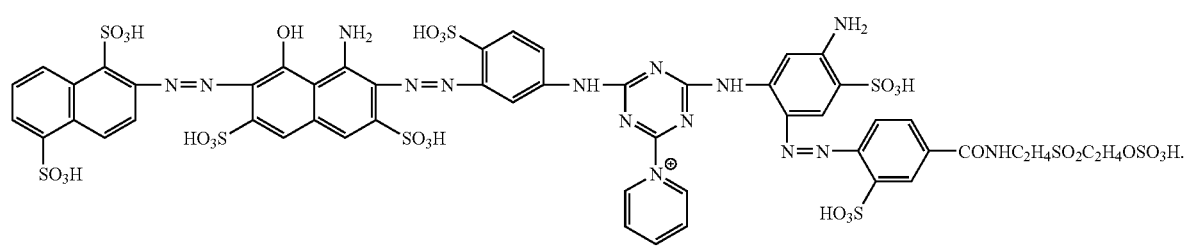
(8)
23. The fiber reactive dyestuff of claim 1, wherein said formula (I) is formula (9):
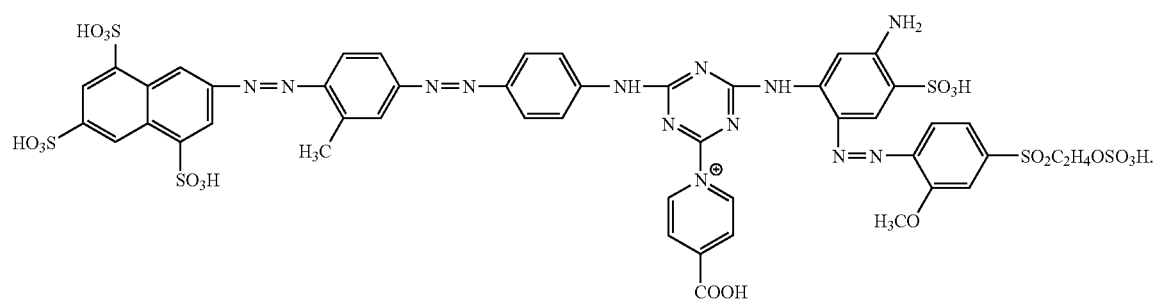
(9)
* * * * *